US008561066B2

(12) United States Patent
Koch et al.

(10) Patent No.: US 8,561,066 B2
(45) Date of Patent: Oct. 15, 2013

(54) SIMPLIFIED DMA MAPPINGS FOR SELF-VIRTUALIZING INPUT/OUTPUT DEVICE VIRTUAL FUNCTIONS

(75) Inventors: Andrew T. Koch, Rochester, MN (US); Kyle A. Lucke, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 12/963,300

(22) Filed: Dec. 8, 2010

(65) Prior Publication Data

US 2012/0151473 A1   Jun. 14, 2012

(51) Int. Cl.
*G06F 9/455* (2006.01)
*G06F 9/46* (2006.01)

(52) U.S. Cl.
USPC ............................................. 718/1; 718/100

(58) Field of Classification Search
None
See application file for complete search history.

(56) References Cited

U.S. PATENT DOCUMENTS

| | | | |
|---|---|---|---|
| 6,721,826 B2* | 4/2004 | Hoglund | 710/52 |
| 6,725,284 B2* | 4/2004 | Arndt | 710/5 |
| 6,877,158 B1* | 4/2005 | Arndt | 718/104 |
| 7,207,041 B2* | 4/2007 | Elson et al. | 718/104 |
| 7,870,301 B2* | 1/2011 | Arndt et al. | 710/8 |
| 8,086,903 B2* | 12/2011 | Arndt et al. | 714/43 |
| 8,095,701 B2* | 1/2012 | Tarui et al. | 710/33 |
| 8,141,092 B2* | 3/2012 | Brown et al. | 718/104 |
| 8,141,093 B2* | 3/2012 | Brown et al. | 718/104 |
| 8,219,988 B2* | 7/2012 | Armstrong et al. | 718/1 |
| 8,219,989 B2* | 7/2012 | Armstrong et al. | 718/1 |
| 2003/0204648 A1* | 10/2003 | Arndt | 710/5 |
| 2006/0195634 A1* | 8/2006 | Arndt et al. | 710/62 |
| 2006/0195673 A1 | 8/2006 | Arndt et al. | |
| 2007/0220246 A1* | 9/2007 | Powell et al. | 713/2 |
| 2008/0091855 A1 | 4/2008 | Moertl et al. | |
| 2009/0037906 A1 | 2/2009 | Armstrong et al. | |
| 2009/0037941 A1 | 2/2009 | Armstrong et al. | |
| 2009/0248937 A1 | 10/2009 | Solomon et al. | |
| 2009/0276605 A1* | 11/2009 | Arndt et al. | 711/209 |
| 2009/0276773 A1 | 11/2009 | Brown et al. | |
| 2009/0313391 A1 | 12/2009 | Watanabe et al. | |
| 2010/0014526 A1 | 1/2010 | Chavan et al. | |
| 2010/0082874 A1 | 4/2010 | Baba et al. | |

(Continued)

OTHER PUBLICATIONS

Raj et al. "High performance and scalable I/O virtualization via self-vidualized devices", Proceedings of the 16th international symposium on High perofmrance distributed computing, 2007, pp. 179-188.

(Continued)

*Primary Examiner* — Jennifer To
*Assistant Examiner* — Bradley Teets
(74) *Attorney, Agent, or Firm* — Wood, Herron & Evans, LLP

(57) ABSTRACT

Multiple translation control entries (TCEs) at the same indices in multiple, same size TCE tables are mapped to facilitate data communication between a self-virtualizing input/output (IO) resource and a logical partition. First and second TCE tables used by an adjunct partition that interfaces a self-virtualizing IO resource with a logical partition may be identically sized, so that whenever a direct memory access (DMA) operation between the self-virtualizing IO resource and the logical partition is desired the same TCE entries in the first and second TCE tables may be used to perform a redirected DMA operation, and without the need to perform hashing or other mapping algorithms to map to the respective TCE entries in the respective TCE tables.

21 Claims, 11 Drawing Sheets

(56) References Cited

U.S. PATENT DOCUMENTS

| | | |
|---|---|---|
| 2010/0095310 A1 | 4/2010 | Oshins et al. |
| 2010/0180274 A1 | 7/2010 | Cherian et al. |
| 2010/0290473 A1 | 11/2010 | Enduri et al. |
| 2012/0124572 A1* | 5/2012 | Cunningham et al. ............ 718/1 |
| 2012/0137288 A1* | 5/2012 | Barrett et al. ..................... 718/1 |
| 2012/0151472 A1 | 6/2012 | Koch et al. |
| 2012/0210044 A1* | 8/2012 | Armstrong et al. ............... 711/6 |

OTHER PUBLICATIONS

U.S. Patent and Trademark Office, Office Action issued in related U.S. Appl. No. 12/946,316, dated Oct. 15, 2012.

U.S. Patent and Trademark Office, Office Action issued in related U.S. Appl. No. 12/963,256, dated Feb. 7, 2013.

U.S. Patent and Trademark Office, Final Office Action issued in related U.S. Appl. No. 12/946,316, dated Mar. 14, 2013.

* cited by examiner

SIMPLIFIED DMA MAPPINGS FOR SELF-VIRTUALIZING INPUT/OUTPUT DEVICE VIRTUAL FUNCTIONS

FIELD OF THE INVENTION

The invention is generally related to data processing, and in particular to logically partitioned data processing systems and self-virtualizing input/output devices for use with same.

BACKGROUND OF THE INVENTION

Modern requirements for a computer system may require that a computer be utilized to run several operating environments, or operating systems, at once. In a typical embodiment, a single logically partitioned computer or data processing system can run a plurality of operating systems in a corresponding plurality of logical partitions (LPARs), also referred to as virtual machines (VMs). Each operating system resides in its own LPAR, with each LPAR allocated a part of a physical processor, an entire physical processor, or multiple physical processors from the computer. Additionally, a portion of the computer's memory is allocated to each LPAR. An underlying partition manager, often referred to as a hypervisor or virtual machine monitor (VMM), manages and controls the LPARs. The hypervisor is typically a part of the system firmware and manages the allocation of resources to the operating systems and LPARs. As such, one logically partitioned computer may run one or more LPARs and thus virtualize the operations of the applications, operating systems, and other program code configured to operate in those logical partitions.

In addition to sharing the physical processors and memory in a logically partitioned computer, LPARs also typically share other types of physical hardware resources, which are collectively referred to herein as input/output (IO) resources. For example, in order to provide LPARs with access to external networks, logically partitioned computers typically include multiple physical network adapters, e.g., network interface cards (NICs), that are shared by the LPARs, such that each LPAR is allocated at least a part of one or more physical network adapters to enable that LPAR to access various networks, e.g., local area networks, wide area networks, storage networks, the Internet, etc. Many IO resources, including many network adapters, are compliant with various Peripheral Component Interconnect (PCI) standards. PCI-compliant IO resources typically implement one or more PCI functions, e.g., to support different protocols such as Ethernet, Fiber Channel over Ethernet (FCoE), etc.

Access to IO resources in both logically partitioned and non-partitioned computers is typically handled at the operating system level through the use of device drivers. Device drivers typically provide a common interface to the operating system and the applications executing thereon to effectively hide the implementation details of a particular hardware device from these higher software layers. High level commands from these higher software layers are typically translated to device-specific commands that are appropriate for the particular make and model of the underlying IO resource. Therefore, so long as different device drivers from different vendors of a particular type of IO resource provide the same common interface to the operating system and applications, the operating system and applications can access the IO resource using the same commands and without concern for the particular make and model of the IO resource.

In many conventional logically partitioned computers, IO resources are virtualized within the hypervisor, so that conventional device drivers, appropriate for use in both logically partitioned and non-partitioned computers, may be used. Virtualization of an IO resource in a hypervisor typically requires that the hypervisor trap device accesses by the device drivers in the LPARs and effectively route the operations to the appropriate physical IO resources. Thus, where multiple LPARs share a common physical IO resource, the hypervisor itself handles the multiplexing of operations performed by the physical IO resource on behalf of each LPAR. Allocating such higher-level functionality to a hypervisor, however, has been found to introduce excessive complexity and processing overhead to the hypervisor. It is desirable in many implementations for a hypervisor to be as small, compact, fast and secure as possible so that the processing overhead of the hypervisor is minimized. As such, other technologies have been introduced in an attempt to off-load the responsibility of virtualizing IO resources from the hypervisor.

For example, in some designs, a dedicated LPAR, referred to as a virtual input/output server (VIOS), may be used to manage the virtualization of IO resources. While the use of a VIOS offloads higher-level functions from the hypervisor and reduces the overall complexity of the hypervisor, it has been found that using LPARs to provide such services to other LPARs requires relatively high overhead to instantiate and run the LPAR, and thus, a full operating system, in order to provide such services.

More recently, some designs have relied upon adjunct partitions (APs), which have also been referred to as partition adjuncts, to assist with the virtualization of IO resources. An AP is a type of partition that is more limited than a full, logical partition. An AP typically runs in a flat, static effective address space and problem state, which permits the hypervisor to apply a range of hypervisor and processor optimizations that result in a substantial decrease in system overhead associated with a context switch of the state machine from an LPAR to state data of an AP, that is, compared to a context switch of the state machine between two LPARs. In other respects, an AP is similar to a full LPAR. For example, an AP typically can be assigned resources, either physical or virtual, similar to a full LPAR. Further, an AP can be an end-point of a virtual input output (VIO) communications mechanism, similar to a full LPAR, such as VIOS.

In addition, some designs have incorporated the concept of self-virtualization of IO resources, where at least a portion of the virtualization of a physical IO resource is handled within the resource itself. The PCI single root input/output virtualization (SRIOV) specification, for example, enables a physical IO resource such as a NIC to incorporate replicated on-board functionality such as memory spaces, work queues, interrupts, and command processing so that a single function such as a single Ethernet connection can be presented to a logically partitioned computer as multiple and separate physical functions. The SRIOV specification introduces the concepts of physical functions (PFs) and virtual functions (VFs), with the former representing full PCI functions and having the ability to instantiate, configure and manage VFs, and the latter representing lightweight PCI functions with reduced configuration resources and usable by LPARs to access a self-virtualizing device.

It has been found that the use of APs in conjunction with self-virtualizing IO resources provides a flexible, efficient framework with which to virtualize IO resources in a logically partitioned computer, and does so without requiring a separate full LPAR to provide the virtualization, and without requiring such functionality to be embedded within client LPARs or in the hypervisor.

Some inefficiencies nonetheless exist in logically-partitioned computers that utilize APs to manage self-virtualizing IO resources. For example, for the purposes of advanced functions such as active memory sharing, where memory resources can be dynamically moved between LPARs, and partition mobility, where LPARs can be dynamically migrated between physical systems, virtual translation control entries (TCEs) are required to enable DMA operations. A TCE is a handle used for IO devices to a real memory address that includes read and write permission bits for that memory space. TCEs are grouped into tables that are managed by device drivers through firmware interfaces. Managing TCEs, however, can be problematic in some scenarios.

For example, it may be desirable to DMA data directly between a self-virtualizing IO resource and a memory buffer in an LPAR without having to first copy the data to the firmware. For this reason, firmware typically supports multiple TCE tables, including one for the interface between the firmware and the LPAR, and another for the virtual function of the self-virtualizing IO resource. In order to support the aforementioned advanced functions such as active memory sharing and partition mobility, however, the TCE table for the interface between the firmware and the LPAR is typically managed as a pseudo-heap data structure, and requires additional overhead of memory and code path. As a consequence, mapping between the different TCE tables in the firmware can become complex, which leads to lower performance due to the need to perform a more complex algorithm to map between the tables.

Therefore, a need exists in the art for a manner of reducing the complexity of mapping TCE entries used in connection with self-virtualizing IO resources in a logically partitioned computer.

SUMMARY OF THE INVENTION

The invention addresses these and other problems associated with the prior art by mapping multiple TCE entries at the same indices in multiple, same size TCE tables to facilitate data communication between a self-virtualizing IO resource and a logical partition. In particular, first and second identically-sized TCE tables may be used by device drivers in an adjunct partition that interfaces a self-virtualizing IO resource with a logical partition, so that whenever a DMA operation between the self-virtualizing IO resource and the logical partition is desired the same TCE entries in the first and second TCE tables may be used to perform a redirected DMA operation. Through the use of identically sized TCE tables, and mapping to the same indexed TCE entries therein, hashing or other algorithms that would otherwise be necessary to map between the tables may be eliminated.

Therefore, consistent with one aspect of the invention, a self-virtualizing input/output (IO) resource may be accessed by multiple logical partitions in a data processing system by interfacing a logical partition of the multiple logical partitions to an associated adjunct partition through a virtual partition interface and communicating data between the logical partition and the self-virtualizing IO resource. The adjunct partition includes a server virtual partition interface device driver configured to interface with a client virtual partition interface device driver in the logical partition and a resource device driver configured to interface with the self-virtualizing IO resource, and the data is communicated by performing a DMA operation between a buffer in the logical partition and the self-virtualizing IO resource using first and second translation control entry (TCE) tables. The first TCE table is associated with the client virtual partition interface device driver and the second TCE table associated with the resource device driver. In addition, the first and second TCE tables each include a same number of TCE entries, and a first TCE entry in the first TCE table that is mapped to the buffer in the logical partition is indexed at a same index in the first TCE table as a second TCE entry in the second TCE table that is used by the resource device driver to initiate the DMA operation between the buffer and the self-virtualizing IO resource.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention map multiple TCE entries at the same indices in multiple, same size TCE tables used by an adjunct partition to facilitate data communication between a self-virtualizing IO resource and a logical partition that are interfaced through the adjunct partition. The TCE tables are respectively associated with device drivers for a virtualized partition interface between the adjunct partition and the logical partition, and for the self-virtualizing IO resource. Whenever a DMA operation between the self-virtualizing IO resource and the logical partition is desired, the same TCE entries in the first and second TCE tables are used to perform a redirected DMA operation, and with the same TCE entries being used, no hashing or other translation algorithm is required to map between the TCE entries in order to perform the redirection.

Hardware and Software Environment

Figure 1:
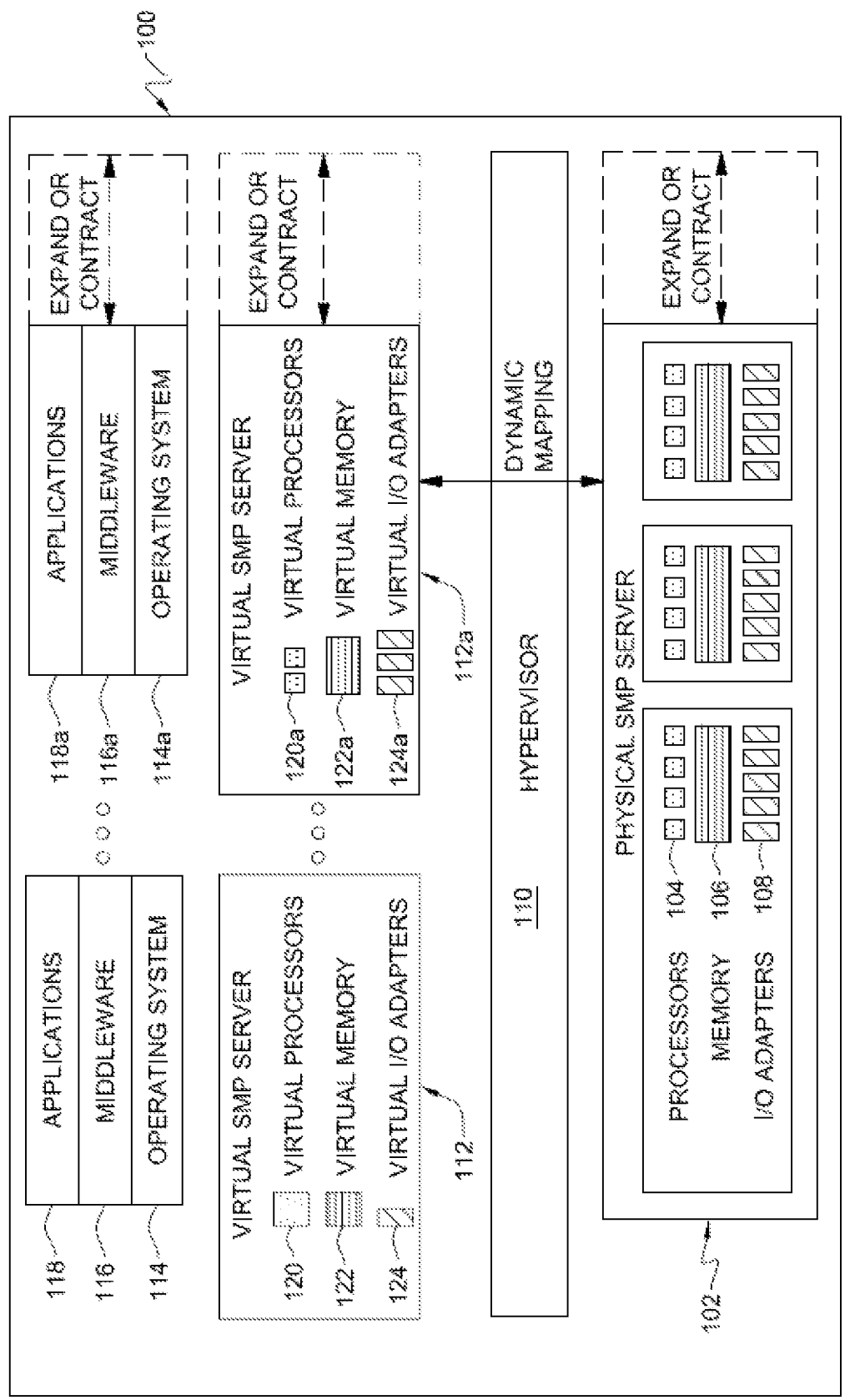
FIG. 1 is a block diagram of one embodiment of a data processing system configured to implement one or more aspects of the present invention.

Now turning to the Drawings, wherein like numbers denote like parts throughout the several views, FIG. 1 is a block diagram of a data processing system or computer 100, which in one example, is a symmetric multiprocessing (SMP) server computer system. SMP server computer system 100 includes physical hardware devices that can be mapped to, i.e., temporarily owned by, a user application to execute that application.

SMP server computer system 100 includes a physical SMP server 102. Physical SMP server 102 includes physical hardware devices such as processors 104, memory 106, and I/O adapters 108. These physical devices are managed by hypervisor 110, which may also be referred to as a partition manager, virtual machine monitor or PHYP. Processors 104 are shared processors and each may be a simultaneous multi-threading (SMT)-capable processor that is capable of concurrently executing multiple different threads on the processor.

A virtual server, or logical partition, is a proxy for a physical server that has the same capabilities, interfaces, and state. Virtual servers 112 are created and managed by a hypervisor 110 that resides on physical SMP server computer system 100. A virtual server appears to be a physical SMP server to its user: the operating system, middleware, and application software that run upon it. SMP server computer system 100 includes one or more virtual servers such as virtual server 112 and virtual server 112a.

Each virtual server appears to its software to include its own processor(s), memory, and I/O adapter(s) that are available for the exclusive use of that virtual server. For example, virtual server 112 includes virtual processors 120, virtual memory 122, and virtual I/O adapters 124. Virtual server 112a includes virtual processors 120a, virtual memory 122a, and virtual I/O adapters 124a.

Each virtual server supports its own software environment, including an operating system, middleware, and applications. The software environment of each virtual server can be different from the software environment of other virtual servers. For example, the operating systems executed by each virtual server may differ from one another.

For example, virtual server 112 supports operating system 114, middleware 116, and applications 118. Virtual server 112a supports operating system 114a, middleware 116a, and applications 118a. Operating systems 114 and 114a may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 110 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. Hypervisor 110 manages the selections of physical devices and their temporary assignment to virtual devices.

Hypervisor 110 services all of the virtual servers or logical partitions during a dispatch time slice. The dispatch time slice is a particular length of time. During each dispatch time slice, hypervisor 110 will allocate, or assign, the physical processor to each logical partition. When the logical partition has been allocated time on the physical processor, the virtual processors defined by that logical partition will be executed by the physical processor.

Hypervisor 110 is responsible for dynamically creating, managing, and destroying virtual SMP servers. Whole virtual processors, virtual I/O adapters, and virtual memory blocks can be removed or added by hypervisor 110. Hypervisor 110 is also responsible for dynamic resource allocation, managing time-sharing of physical resources, and altering the physical resource mapped to a processor without involving the operating system. Hypervisor 110 is also able to dedicate physical resources to virtual resources for situations where sharing is not desired. Hypervisor 110 is responsible for managing the addition or removal of physical resources. Hypervisor 110 makes these additions and deletions transparent to the upper level applications.

Figure 2:
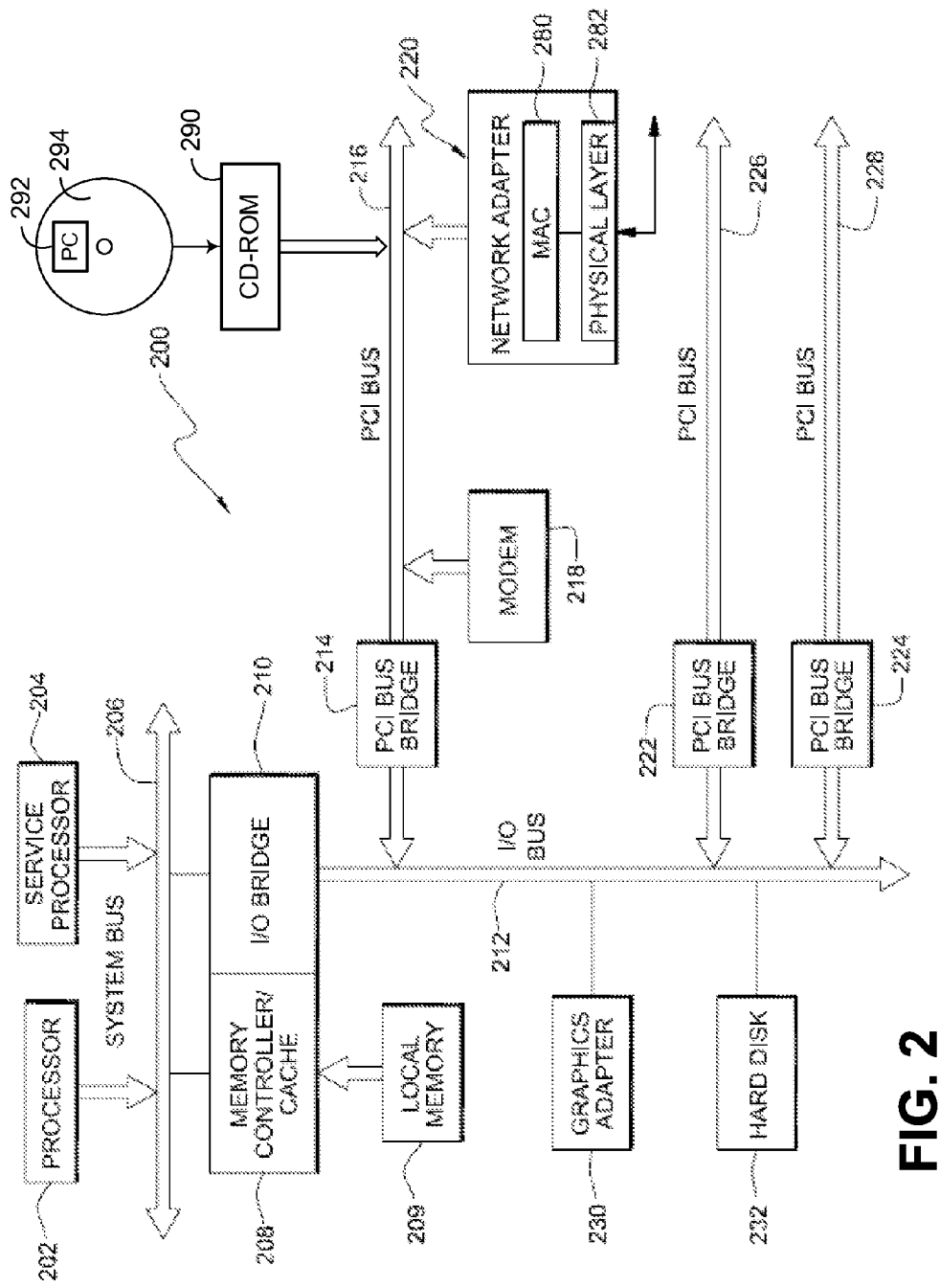
FIG. 2 is a more detailed illustration of a data processing system that may be used to implement one or more aspects of the present invention.

FIG. 2 is a more detailed illustration of a computer system that may be used to implement the concepts described herein. Data processing system 200 may be a symmetric multiprocessor (SMP) system including a plurality of shared processors or SMT-capable processors, such as processors 202 and 204 connected to system bus 206. Alternatively, a single processor system may be employed. In the depicted example, processor 204 is a service processor. Each SMT-capable processor is capable of concurrently executing multiple hardware threads on the one processor.

Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Network adapter 220 includes a physical layer 282 which conditions analog signals to go out to the network, such as for example, an Ethernet network for an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Service processor 204 interrogates system processors, memory components, and I/O bridges to generate and inventory and topology understanding of data processing system 200. Service processor 204 also executes Built-In-Self-Tests (BISTs), Basic Assurance Tests (BATs), and memory tests on all elements found by interrogating a system processor, memory controller, and I/O bridge. Any error information for failures detected during the BISTs, BATs, and memory tests are gathered and reported by service processor 204.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The present invention may be executed within one of the computers or data processing systems depicted in FIG. 1 or 2. As a specific, commercially available example, the data processing system implementing an adjunct partition such as described hereinbelow can be built upon technologies found in IBM's p/i Series product line firmware and systemware, such as described in the "Power Architecture Platform Reference" (PAPR) material at Power.org.

One or more aspects of the present invention can also be included in an article of manufacture (e.g., one or more computer program products) having, for instance, computer readable media. The media has therein, for instance, computer readable program code or logic (e.g., instructions, code, commands, etc.) to provide and facilitate the capabilities of the present invention. The article of manufacture can be included as a part of a computer system or sold separately. One example of an article of manufacture or a computer program product is illustrated in FIG. 2 and incorporates computer readable program code 292 stored on a computer readable medium such as an optical disk 294, and readable by an optical drive 290 coupled to data processing system 200. Additional examples of computer readable media include various physical and/or non-transitory media such as a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-RAN) and DVD.

A sequence of program instructions or a logical assembly of one or more interrelated modules defined by computer readable program code or logic direct the performance of one or more aspects of the present invention.

Although various embodiments are described herein, these are only examples. Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one hardware-implemented processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output (I/O) devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

In addition, various program code described herein may be identified based upon the application or software component within which it is implemented in specific embodiments of the invention. However, it should be appreciated that any particular program nomenclature used herein is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Adjunct Partitions

Embodiments consistent with the invention utilize adjunct partitions, or partition adjuncts, which are partitions that are more limited than full, logical partitions. As described below, the adjunct partition runs in a flat, static effective address space and problem state. These restrictions permit the hypervisor to apply a range of hypervisor and processor optimizations that result in a substantial decrease in system overhead associated with a context switch of the state machine from a logical partition to state data of an adjunct partition, that is, compared to a context switch of the state machine between logical partitions. In other respects, an adjunct partition is similar to a full logical partition. For example, an adjunct partition can be assigned resources, either physical or virtual, similar to a full logical partition. Further, an adjunct partition can be an end-point of a virtual input output (VIO) communications mechanism, similar to a full logical partition, such as a virtual input output server (VIOS).

Figure 3:
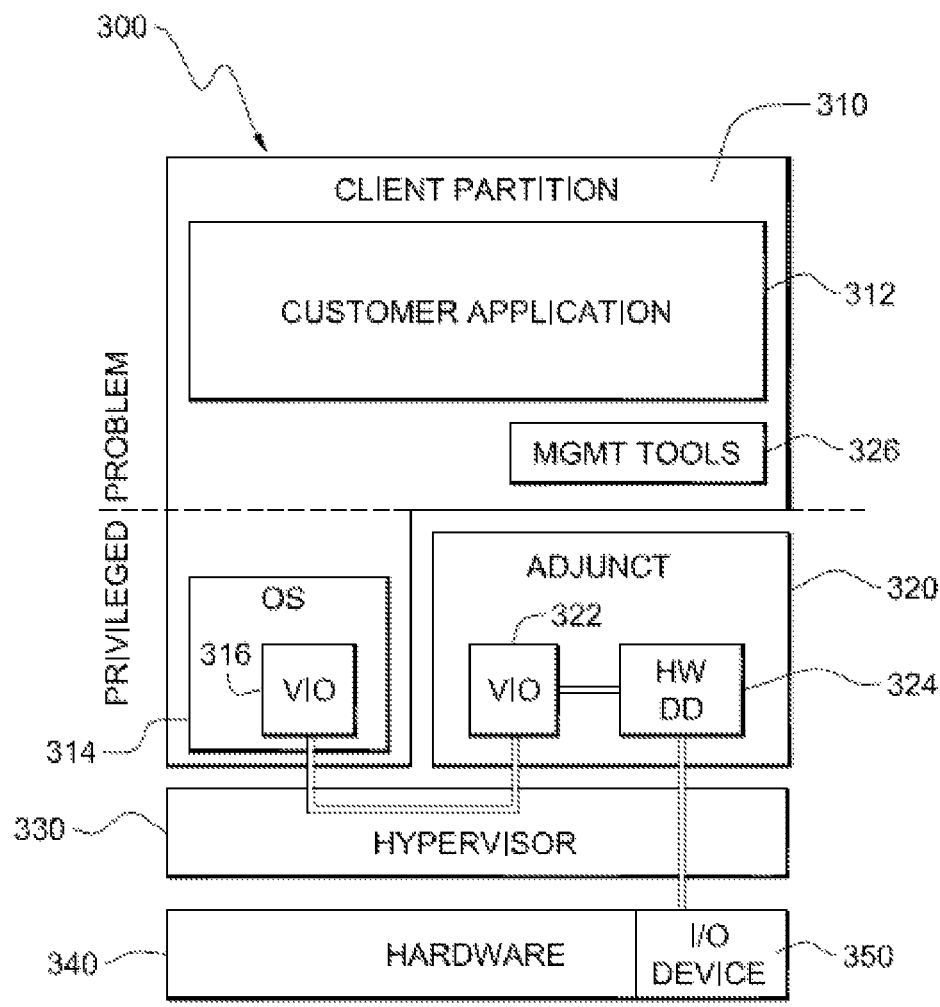
FIG. 3 illustrates one embodiment of a data processing system comprising a client logical partition and an adjunct partition, in accordance with an aspect of the present invention.

FIG. 3 illustrates one example of a data processing system 300, comprising a client logical partition (or simply client partition) 310 and an adjunct partition 320, in accordance with an aspect of the present invention. Client partition 310 is a logical partition which comprises one or more customer applications 312, an operating system instance 314 and a virtual I/O facility 316. Client partition 310 runs atop a hypervisor 330, and provides higher-level function than that provided by the hypervisor itself. Hypervisor 330 executes atop the underlying system hardware 340, which is shown to include one or more I/O devices 350.

Adjunct partition 320 is conceptually a child partition to client partition 310. The adjunct partition is less than a full logical partition, but is run in a manner whereby the hypervisor enforces security and isolation between the adjunct partition and the client partition it runs within. The adjunct partition is provided with reduced functionality compared with a full logical partition, for example, has no access to memory management unit (MMU) configuration or floating-point facilities, and is an environment that only the functionality needed to run the desired service (e.g., I/O driver) is provided. In the illustrated example, adjunct partition 320 includes a virtual I/O interface 322 and a hardware device driver service 324, which allows access to I/O device 350. In operation, client partition 310 accesses I/O device 350 via the adjunct partition 320, as illustrated. By reducing functionality within the adjunct partition environment, the run time overhead of dispatching and maintaining the adjunct partition (compared with another full logical partition) is reduced, and consequently, many of the performance disadvantages of using a separate logical partition as a virtual input output server (VIOS) are avoided.

As a specific example, the adjunct partition is described herein as running a reduced operating system environment for a device driver service. This service is provided by way of example only. The adjunct partition provides minimal, optimized, infrastructure comprising only (in one example) the structure needed by a device driver. For instance, if a Linux device driver is to run inside of the adjunct partition, then the minimal execution environment includes only the Linux kernel services or equivalent services, that the Linux device driver requires. If an AIX (Advanced IBM Unix) device driver is to run inside of the adjunct partition, then the minimal execution environment includes only the AIX kernel services, or equivalent services, that the AIX device driver requires. Advantageously, the adjunct partition runs in hypervisor/problem-state, directly against hypervisor interfaces. As explained in detail below, dispatching of the adjunct partition does not require a full partition context switch, which simplifies adjunct kernel requirements. This is achieved, in part, by mapping the adjunct partition into the client partition's virtual address page table. Client partition to adjunct partition isolation can be achieved, for example, via hypervisor-managed memory keys. Advantageously, the adjunct partition is not customer viewable. Further, the same adjunct partition service (referred to herein as a global adjunct partition service) may be instantiated within multiple client partitions, as explained below.

Various adjunct partition usage models can be implemented in accordance with the concepts disclosed herein for addressing a number of operating system and platform issues. One example is a local adjunct partition, which conceptually partially resides within an initiating client partition for accessing dedicated resources through a hypervisor. For example, a common adapter/driver service may be provided by adjunct partition for a respective dedicated adapter (i.e., resource).

As another alternative, a global adjunct partition may be used, wherein a service logical partition such as a virtual input output server partition donates memory and physical resources for instantiation of the adjunct partition. Such a global adjunct partition may be accessible or attachable by multiple client partitions, and may provide, for example, input output services to a resource via a hypervisor. As a specific example, the global adjunct partition may comprise a common adapter driver service, and the resource a shared adapter. Yet another embodiment of a global adjunct partition may rely on a hypervisor to provide resources for the adjunct. In this implementation, the hypervisor employs the adjunct partition for its own use, for example, for protection or isolation services that would otherwise exist in the hypervisor's execution domain.

In the illustrated embodiments, in order for an adjunct partition to be a runable program, the hypervisor, along with a client partition that is to use the adjunct partition service, negotiate to establish the adjunct partition environment. Once this negotiation is complete, the client partition will have donated a portion of its virtual address space to the hypervisor for use by the adjunct partition. The hypervisor will use hardware and hypervisor facilities to ensure that the client partition no longer has access to or can modify the donated resources (e.g., the donated virtual address space). The hypervisor instantiates the effective address mappings required to run the adjunct partition using the donated virtual address resources. Subsequently, the hypervisor may switch between dispatching the client partition or the adjunct partition by reprogramming its control of the donated virtual address space. When the client partition runs, it may access all virtual address space assigned to it, except for the donated virtual address range, and when the adjunct partition runs, the hypervisor disables access to all virtual addresses of the client partition, except for the donated virtual address range, that is, the virtual address space to which it is enabled. This toggling of active/inactive virtual address ranges is significantly faster than reprogramming the full memory management and address translation hardware to effect a complete context switch of the current state machine between two full logical partitions, as is necessary to switch, for example, to a virtual input/output server partition. In this manner, the adjunct partition address space is carved out of and separated from the memory management and address translation hardware resources of the client partition. The adjunct partition is thus, from a processor's perspective, part of the client partition, but from the client partition's and hypervisor's perspective, is a distinct entity.

Advantageously, the adjunct partition concepts presented herein reduce the need to use full logical partitions for providing services to client partitions. This in turn frees up resources and improves performance for customer workloads. Additionally, the adjunct partition disclosed herein encourages the development and deployment of virtual platform services in lieu of development of operating system specific services by reducing the performance penalties associated with virtualized services. This in turn allows for savings and cost development, since services may be implemented only once (i.e., in an adjunct partition), rather than natively among multiple operating systems.

Additional details regarding adjunct partitions, their configuration and use, and the various modifications that may be implemented in adjunct partitions consistent with the invention, may be found, for example, in U.S. patent application Ser. No. 12/111,020 filed Apr. 28, 2008 by Armstrong et al. (now published as U.S. P.G. Pub. No. 2009/0037941), which claims priority to U.S. Provisional Application Ser. No. 60/953,512, filed Aug. 2, 2007, each of which is incorporated by reference herein in its entirety.

Figure 4A:
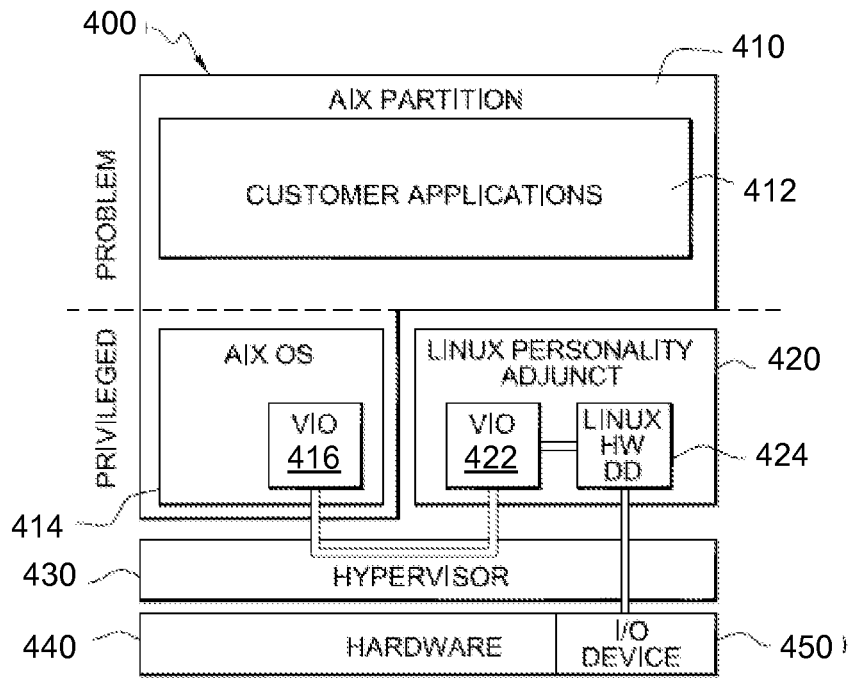
FIGS. 4A & 4B illustrate examples of an adjunct partition configuration wherein non-native operating system's device drivers are employed to access or use a physical input/output device, in accordance with an aspect of the present invention.
Figure 4B:
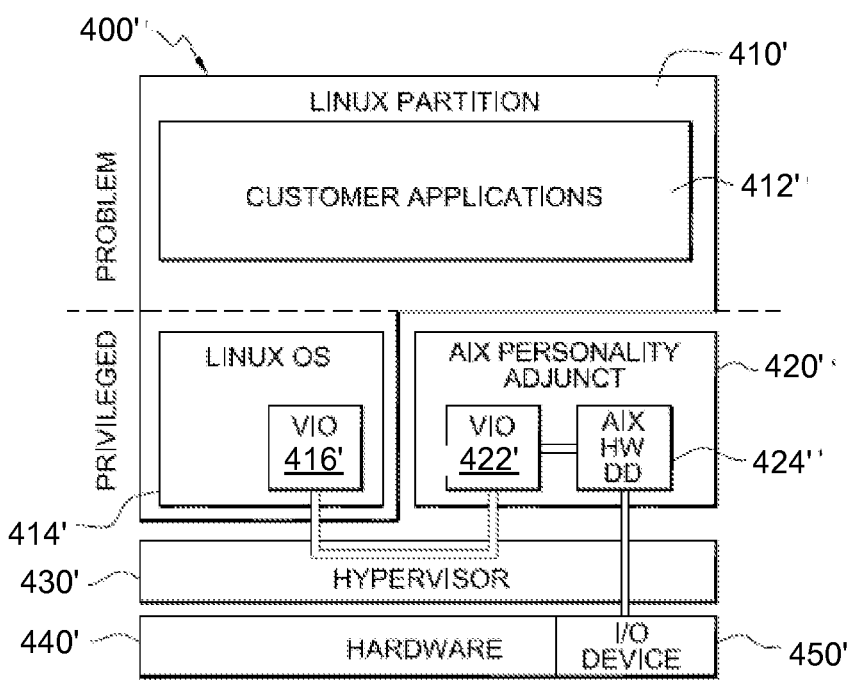

As noted above, one usage of adjunct partitions is to host device drivers, which can reduce device driver development costs by enabling device drivers to be shared between operating systems. Adjunct partitions are lightweight execution environments which operate in a separate execution state from the conventional problem and privileged states of the user applications and kernel services, respectively. This new execution state is referred to herein as the hypervisor/problem state, and is illustrated in FIGS. 4A & 4B (wherein AIX and Linux are depicted by way of example only). As explained below, instead of deploying a full VIOS partition, an operating system may instead employ an adjunct partition to support a particular, non-configurable I/O device assigned to that logical partition. In such a case, an adjunct partition is created which employs a non-native operating system's device driver as an interface to the assigned physical I/O device. Note that the native and non-native operating systems may be any two different operating systems.

FIG. 4A depicts one example of this aspect of the present invention. In this figure, a data processing system 400 is shown to comprise an AIX partition 410 and a Linux personality adjunct partition (or Linux personality adjunct) 420. AIX partition 410 is a logical partition which includes one or more customer applications 412, an AIX operating system instance 414, and a virtual I/O facility 416. AIX partition 410 runs above a hypervisor 430, and provides higher-level function than that provided by the hypervisor. Hypervisor 430 executes on top of the underlying system hardware 440, which is shown to include (one or more) I/O device 450 assigned to AIX partition 410.

Linux personality adjunct 420 is conceptually a dedicated, child partition to AIX partition 410. As described above, the adjunct partition is less than a full logical partition, but is running in a manner whereby the hypervisor enforces security and isolation between the adjunct partition and the AIX partition it runs with. The adjunct partition is provided with reduced functionality compared with a full logical partition. For example, the adjunct partition has no access to memory management unit (MMU) configuration or floating-point facilities, and is an environment wherein only the functionality needed to run the desired service (e.g., I/O driver) is provided.

In the illustrated example, the Linux personality adjunct 420 includes a virtual I/O interface 422 and a hardware device driver service 424, which allows access to I/O device 450. In this example, the hardware device driver service 424 is a Linux hardware device driver, which runs within the Linux personality adjunct 420 spawned by the AIX partition 410 in response to the AIX partition noting that it had assigned to it an I/O device 450 which was non-configurable by the AIX partition. The Linux personality adjunct 420 includes non-native kernel services sufficient to run the Linux hardware device driver for the physical I/O device. These non-native kernel services are less than a corresponding, full operating system, that is, less than a full Linux operating system in this example.

In operation, AIX partition 410 accesses I/O device 450 via the virtual I/O interface 416, 422 between the AIX operating system 414 and the Linux personality adjunct 420, which includes the Linux hardware device driver 424. By providing the non-native, Linux personality to the adjunct partition, the Linux hardware device driver is able to be run within the adjunct partition, and thereby provide access to an I/O device 450 originally assigned to AIX partition 410, notwithstanding that the I/O device is non-configurable by the AIX partition. The device becomes accessible to the AIX partition through the Linux personality adjunct 420.

FIG. 4B depicts another example of the use of an adjunct partition to provide access to a non-configurable I/O device assigned to a logical partition, which in this case is a Linux partition 410' of a data processing system 400'. The adjunct partition for this implementation is an AIX personality adjunct 420', which includes sufficient non-native, AIX kernel services within the adjunct partition to run a non-native operating system's device driver, that is, an AIX hardware device driver 424' in this example. These non-native kernel services are less than a corresponding, full operating system, that is, less than the full AIX operating system conventionally required to run the AIX hardware device driver. The Linux partition 410' is a logical partition which includes one or more customer applications 412', a Linux operating system 414', and a virtual I/O facility 416'. Linux partition 410' runs above a hypervisor 430', and provides higher-level function than that provided by the hypervisor. Hypervisor 430' executes on top of the underlying system hardware 440', which is shown to include (one or more) I/O device 450'.

AIX personality adjunct 420' is again conceptually a child partition to client partition 410'. The adjunct partition is less than a full logical partition, but is run in a manner whereby the hypervisor enforces security and isolation between the adjunct partition and the client partition it runs within, as described above. The adjunct partition is an environment wherein only the functionality needed to run the desired service (e.g., I/O driver) is provided. In this example, it is assumed that the adjunct is dedicated to the spawning logical partition, that is, Linux partition 410'.

In the illustrated example, AIX personality adjunct 420' includes a virtual I/O interface 422' and the AIX hardware device driver 424', which allows access to I/O device 450'. In operation, Linux partition 410' accesses I/O device 450' via the adjunct partition 420', as illustrated.

As used herein, a personality adjunct is an adjunct partition which has a particular operating system personality, but is less than the full operating system. In the implementation described herein, the personality adjunct is a non-native personality to the native operating system of the logical partition spawning the adjunct partition. For example, AIX partition 410 of FIG. 4A initiates creation of a Linux personality adjunct, while Linux partition 410' of FIG. 4B initiates creation of an AIX personality adjunct. These are provided by way of example only. In an alternate implementation, the personality adjunct may be a native personality to a native operating system of the logical partition spawning the adjunct partition. Further, in the non-native implementation, the personality implemented within the adjunct partition may be any non-native operating system to any native operating system of the logical partition. The personality adjunct includes a minimal service set of an operating system device driver runtime environment required by a particular device driver to run inside the adjunct. A device driver conforms to a programming environment that is defined by its host operating system environment. This programming environment typically includes a variety of kernel services for things such as memory allocation, timer services, interrupt handler registration, and invocation in response to interrupts, mapping I/O buffers for DMA (direct memory access), etc. The personality adjunct provides these services and functions in the same way that a real host operating system kernel does, such that the device driver running inside the adjunct does not know the difference between its native host operating environment and the personality adjunct described herein. This enables the unmodified device driver to be run within a lighter weight adjunct partition, in place of a full logical partition.

By way of specific example, the Linux personality adjunct 420 of FIG. 4A provides a runtime environment and kernel services which mimic the Linux device driver programming interfaces and execution environment, while the AIX personality adjunct 420' of FIG. 4B provides the runtime environment and kernel services which mimic the AIX device driver programming interfaces and execution environment of a full AIX operating system.

Multiple adjunct partitions may also be employed to provide multiple logical partitions with access to, for example, a self-virtualizing input/output device, such as a self-virtualizing input/output adapter. In a virtualized system, if a single input/output adapter is present, and that adapter is to service multiple logical partitions of the data processing system, then input/output virtualization (IOV) capabilities of the input/output device, if present, may be employed to instantiate multiple virtual functions (VF), each of which appears as an input/output adapter to a respective client logical partition. One example of a self-virtualizing input/output device is the single root input/output virtualized hardware described, for example, in "Single Root I/O Virtualization and Sharing Specification", Revision 1.0, PCI-SIG (Sep. 11, 2007), which is incorporated herein by reference in its entirety.

Adjunct partition instances may be deployed in a manner wherein each adjunct partition instance is created to support a particular logical partition to virtual function (or queue pair) pairing. Using this approach, each logical partition accesses a corresponding virtual function or queue pair employing abstract virtual input/output mechanisms. From the point of view of the client partition, this functionality is similar (or equivalent) to a VIOS implementation. However, the disadvantages of such a system are avoided since each logical partition to virtual function (or queue pair) association has a unique adjunct partition instance facilitating communication therebetween. Since each adjunct partition instance handles only a single logical partition and a single virtual function (or queue pair) it is not necessary to include locks or synchronization mechanisms otherwise needed to support multiplexing of the I/O adapter, since the system relies on the multiplexing capabilities within the self-virtualizing input/output capable device itself.

Another advantage of this adjunct partition implementation is that, since all adjunct partition instances are considered for the same device, they are able to share code and read only data, which substantially reduces the memory foot-print required to support the implementation, with the memory foot-print cost of adding an adjunct partition instance being simply the cost associated with maintaining dynamic state information for the logical partition to virtual function (or queue pair) pairing for the new adjunct partition instance.

Further, adjunct partition instances, since they are configured to support only one logical partition to virtual function (or queue pair) pairing at a time, may be readily written in a manner to avoid many of the synchronization and locking mechanisms required by traditional I/O stacks and drivers, both in native device drivers and VIOS-based implementations. For example, adjunct partitions may be written as polling state machines, and the dedicated nature of their runtime environment precludes the need to support active preemption, thus simplifying or eliminating the need for locking.

To summarize, the use of adjunct partitions in the manner described herein permits logical partitions to obtain I/O services from input/output virtualization-capable, input/output devices or adapters in a manner that minimizes the device-driver development required for each operating system of the logical partition, since the operating systems only see virtual input/output (VIO) services (e.g., device driver services), not specific physical input/output adapter devices. This avoids the need to instantiate a logical partition to multiplex the underlying I/O hardware, and permits the multiplexing of I/O hardware to be accomplished via efficient VIO hardware capabilities, rather than software locks in a VIOS. This last aspect is a property that arises from the unique programming model of an adjunct partition, and assumes that a particular adjunct partition implementation used to support a particular I/O device makes use of these properties to create an efficient implementation.

Figure 5:
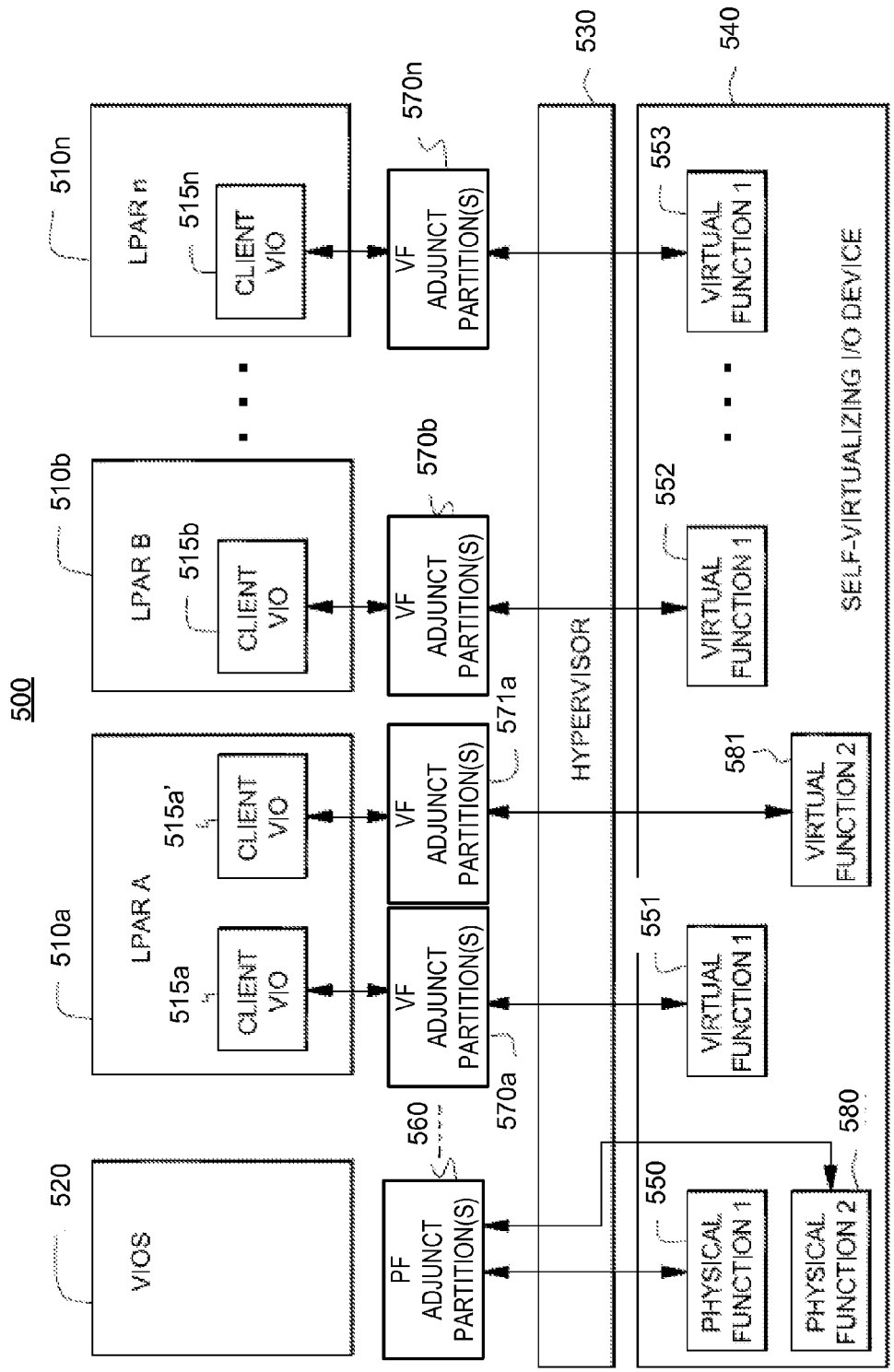
FIG. 5 illustrates one embodiment of a data processing system wherein multiple logical partitions are interfaced via device drivers within the multiple logical partitions to multiple virtual function instances of a self-virtualizing IO resource.

FIG. 5 depicts one embodiment of a data processing system, generally denoted 500, in accordance with an aspect of the present invention. Within data processing system 500, multiple logical partitions 510a, 510b . . . 510n, and a VIOS 520 run above a hypervisor 530, and provide higher-level function than that provided by the hypervisor. Hypervisor 530 executes on top of underlying system hardware, including a self-virtualizing input/output device (or adapter) 540. VIOS 520 is optional within the data processing system embodiment depicted. The self-virtualizing input/output device 540 is, in one embodiment, an input/output virtualization capable I/O adapter. This adapter may present multiple virtual function instances 551, 552, 553 from a first physical function 550, each of which presents the functionality associated with a normal I/O adapter. Further, in this embodiment, a second physical function 580 is depicted, from which a second virtual function 581 is provided, by way of example.

Each virtual function is assigned to provide I/O services to a particular logical partition in the data processing system. The logical partitions in question avoid having direct interactions with their virtual functions, so as to maintain hardware abstraction, by employing adjunct partition instances instantiated for each logical partition to virtual function pairing. These adjunct partitions 570a, 571a, 570b, 570n are referred to as virtual function (VF) adjunct partitions due to the dedicated nature of the adjunct partitions to a particular logical partition to virtual function pairing. For all virtual functions associated with a same underlying hardware device, i.e., physical function 550 or physical function 580, the adjunct partition instances instantiated are the same. That is, each adjunct partition instance 570a, 570b . . . 570n is the same, while adjunct partition instantiation 571a is assumed to be different since it interfaces to a different virtual function 581, associated with a different physical function 580. Advantageously, by interjecting adjunct partitions between the logical partitions and the virtual functions, the input/output within each logical partition can be virtualized as a client virtual input/output (VIO) 515a, 515a', 515b . . . 515n.

By way of specific example, the underlying physical function might comprise a peripheral component interconnect (PCI) function that supports the single root I/O virtualization capabilities (SR-IOV) defined in the above-referenced "Single Root I/O Virtualization and Sharing Specification". The physical function would thus contain the SR-IOV capability structure. A virtual function is associated with the physical function, and shares one or more physical resources, such as a link, with the physical function and with other virtual functions that are associated with the same virtual function. A "function" means, in one embodiment, an addressable entity in configuration space associated with a single function number. A function may refer to one function in a multi-function device, or to the only function in a single-function device.

A physical function adjunct partition 560 is employed during initial configuration of the data processing system to facilitate setup of the virtual function adjunct partitions. Note that in the data processing system embodiment depicted in FIG. 5, multiple physical functions and multiple different virtual function instances are illustrated, two of which are accessed by a single logical partition via different virtual function adjunct partitions 570a, 571a. One, two or more than two physical functions may be implemented within the self-virtualizing input/output device, and each logical partition may access one or more of these physical functions via an associated virtual function of the device. Also, note that the client virtualized interfaces or drivers (client VIO 515a, client VIO 515a') within LPAR A 510a may be the same or different types of virtual interfaces or drivers, depending on the adjunct partition instances implemented for the particular logical partition to virtual function pairing.

The virtual function adjunct partitions 570a, 571a, 570b, 570n implement, in one embodiment, a server virtual adapter device driver, which interfaces with the respective client VIO within the associated logical partition, as well as a device driver for the virtual function on the self-virtualizing input/output device adapter. Each adjunct partition drives the respective virtual function on the adapter similar to the server virtual adapter device driver within a VIOS implementation. Creation of the adjunct partitions may be initiated by the respective logical partition, or by the hypervisor within the data processing system. Further, the advantages and characteristics of the respective adjunct partitions would be the same as described above. By way of example, each adjunct partition may implement a non-native operating system's device driver from the native operating system of the associated logical partition.

Those skilled in the art will note from the above discussion that the programming model described herein allows adjunct partition code developers to write code in a manner that allows typical operating system-kernel-code locking and synchronization primitives to be simplified or avoided. Adjunct partitions may be efficiently written as single-threaded polling state machines, and by controlling the degree of concurrency visible to a particular adjunct partition instance, it is possible to ensure that adjunct partition code may assume a runtime environment that is non-preemptive and single-threaded. For input/output processing work, there is little need for multiple threads to simultaneously execute to service a particular logical partition to virtual function pairing. These properties are feasible because each adjunct partition instance services a single logical partition to virtual function pairing in an isolated/protected environment (that is, a separate dispatchable state protected as described above), and adjunct partition instances can be deployed with overhead low enough to permit a single adjunct instance per logical partition to virtual function pairing, unlike a VIOS implementation.

Similarly, a data processing system similar to data processing system 500 may be utilized in connection with a self-virtualizing input/output device that utilizes a basic function and a queue structure virtualizable into multiple queue pairs. Each queue pair may be associated with the function, and may share one or more physical resources, such as a link, with the function and with other queue pairs that are associated with the same function. Multiple adjunct partitions may be employed to interface, for example, multiple logical partitions to respective queue pairs within the self-virtualizing input/output device, with a function adjunct partition employed during initial configuration of the data processing system to facilitate initial setup of the adjunct partitions. By providing an adjunct partition as an interface between each logical partition to queue pair pairing, a virtual input/output interface or driver can be employed within the respective logical partition. In this case, the logical partition is unaware of the actual type of hardware employed. The adjunct partition may include, for example, a server virtual device driver interfaced to a respective client VIO of the associated logical partition, as well as an appropriate physical adapter device driver for interfacing to the respective queue pair within the self-virtualizing input/output device.

Additional details regarding adjunct partitions are described in the aforementioned cross-referenced applications. In addition, various modifications to the adjunct partitions described herein will be appreciated by one of ordinary skill in the art having the benefit of the instant disclosure. Therefore, the invention is not limited to the particular adjunct partition implementations discussed herein.

Vender-Independent Virtual Network Partition Interface

To facilitate the integration of new or upgraded self-virtualizing 10 resources such as self-virtualizing network adapters, a vendor-independent partition interface may be utilized between a logical partition and an adjunct partition associated with a self-virtualizing IO resource to effectively abstract away vender-specific interface details for the self-virtualizing IO resource.

Figure 6:
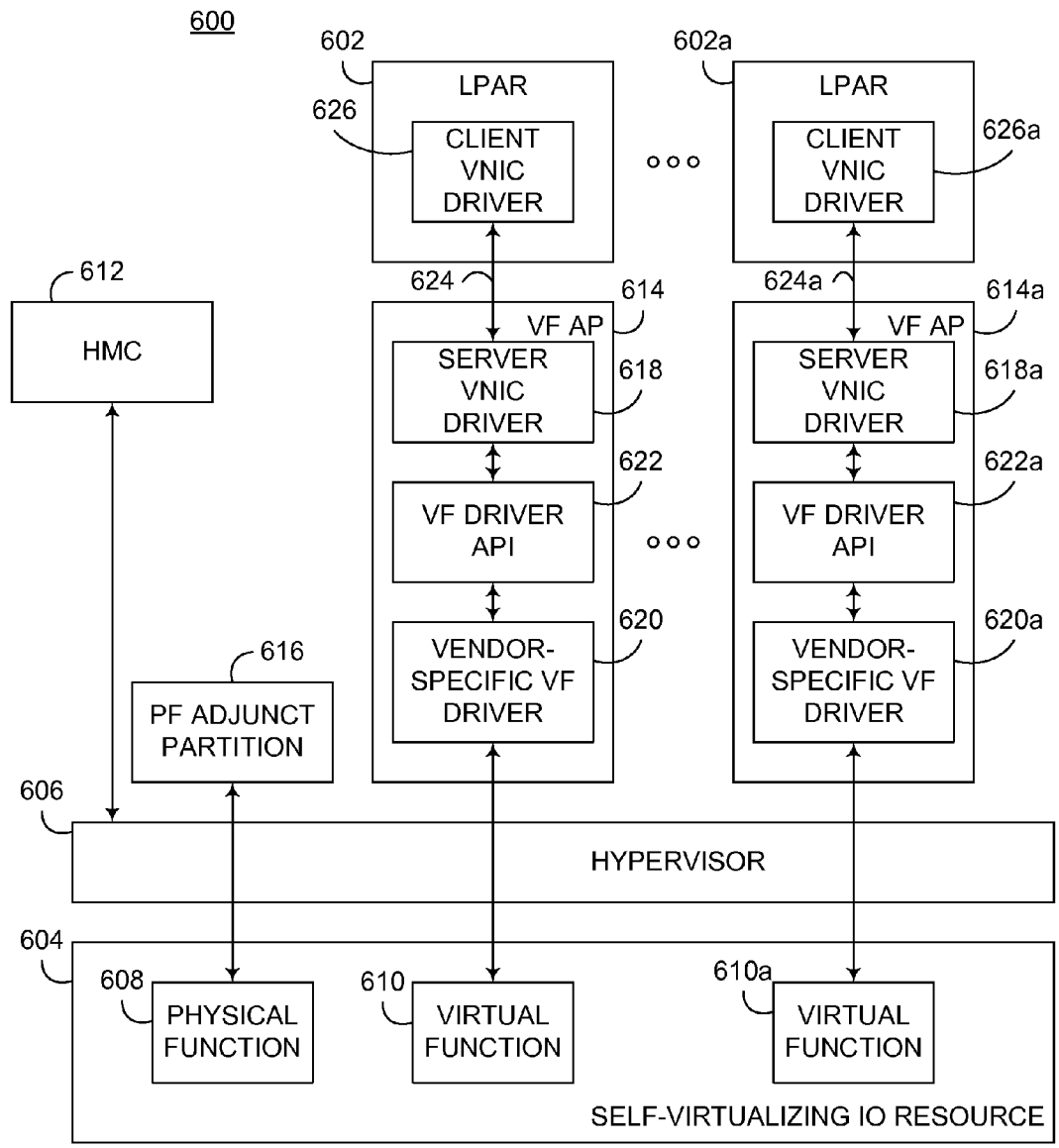
FIG. 6 illustrates one embodiment of a data processing system wherein multiple logical partitions are interfaced with multiple virtual function instances of a self-virtualizing IO resource through associated adjunct partitions incorporating vendor-independent virtual network partition interfaces consistent with the invention.

As shown in FIG. 6, for example, a data processing system 600 may include multiple logical partitions 602, 602a interfacing with a self-virtualizing 10 resource 604 through a hypervisor 606. Hypervisor 606 executes on top of other underlying system hardware in addition to self-virtualizing IO resource 604; however, only resource 604 is illustrated to facilitate a better understanding of the invention. The self-virtualizing input/output device 604 is, in one embodiment, an input/output virtualization capable I/O adapter. This adapter may present multiple physical functions, each of which presenting the functionality associated with a non-virtualized I/O adapter, and each with multiple virtual function instances associated therewith, e.g., physical function 608 with associated virtual function instances 610, 610a. A hardware management console (HMC) 612, run above a hypervisor 606, may optionally be used to provide higher-level function than that provided by the hypervisor.

Each virtual function is assigned to provide I/O services to a particular logical partition in the data processing system. The logical partitions in question avoid having direct interactions with their virtual functions, so as to maintain hardware abstraction, by employing adjunct partition instances instantiated for each logical partition to virtual function pairing. These adjunct partitions 614, 614a, which are implemented as firmware components for data processing system 600, are referred to as virtual function (VF) adjunct partitions due to the dedicated nature of the adjunct partitions to a particular logical partition to virtual function pairing. For all virtual functions associated with a same underlying hardware device, i.e., physical function 608, the adjunct partition instances instantiated are the same. That is, each adjunct partition instance 614, 614a is the same.

By way of specific example, the underlying physical function might comprise a peripheral component interconnect (PCI) function that supports the single root I/O virtualization capabilities (SR-IOV) defined in the above-referenced "Single Root I/O Virtualization and Sharing Specification," and described above in connection with FIG. 5. The physical function would thus contain the SR-IOV capability structure. A virtual function is associated with the physical function, and shares one or more physical resources, such as a link, with the physical function and with other virtual functions that are associated with the same virtual function.

A physical function adjunct partition 616 is employed during initial configuration of the data processing system to facilitate setup of the virtual function adjunct partitions. One, two or more than two physical functions may be implemented within the self-virtualizing input/output device, and each logical partition may access one or more of these physical functions via an associated virtual function of the device.

It the illustrated embodiment, each adjunct partition includes a server device driver 618, 618a, vendor-specific virtual function device driver 620, 620a and virtual function driver API 622, 622a. Server device driver 618, 618a provides a generic, vendor-independent virtual network partition interface 624, 624a with a client device driver 626, 626a in the associated logical partition 602, 602a. The interface is generic and vendor-independent to the extent that the interface does not need to be changed or tailored based upon vendor-specific implementation details of different makes and models of self-virtualizing IO resources. Vendor-specific implementation details are instead handled in the vendor-specific virtual function device driver 620, 620a, which is accessible to the server device driver 618, 618a through a VF driver API 622. API 622, which is optional in some embodiments, further abstracts away implementation details to higher software layers, and further limits the amount of customization required to accommodate new makes and models of self-virtualizing 10 resources. In many instances, VF driver API 622 may require no modifications in order to support new or revised vendor-specific virtual function device drivers 620, 620a.

In the illustrated embodiment, the vendor-independent virtual network partition interface relies on a network protocol, referred to herein as a virtual network interface controller (VNIC) protocol, to facilitate communications between client and server device drivers. The herein-described protocol supports the implementation, within a client logical partition, of a VNIC adapter device driver (VNIC client), which is functionally similar to a physical Ethernet adapter device driver, and is thus usable to interface with a virtual function of a self-virtualizing IO resource such as an SRIOV network adapter. The VNIC protocol supports sending and receiving Ethernet-compatible packets, adding receive buffers to the virtualized hardware, handling physical and logical link status, acquiring hardware statistics, and utilizing advanced hardware features like checksum offload. The VNIC protocol also provides tracing, logging, and dumping facilities, and the VNIC protocol desirably requires no changes in any layer 3 or higher communication protocol (e.g. TCP, IP, etc.). The VNIC protocol also desirably has reliability, availability and support (RAS) capabilities, and supports the concept of privileges, e.g., to enable a logical partition to set physical port attributes and run diagnostics. It will be appreciated, however, that a vendor-independent virtual network partition interface may be implemented using different protocols, so the invention is not limited to the particular VNIC protocol described herein.

Thus, each adjunct partition 614, 614a drives the respective virtual function on the self-virtualizing adapter similar to a server virtual adapter device driver within a VIOS implementation. Creation of an adjunct partition may be initiated by the respective logical partition, or by the hypervisor within the data processing system. Further, the advantages and characteristics of the respective adjunct partitions would be the same as described above. By way of example, each adjunct partition may implement a non-native operating system's device driver from the native operating system of the associated logical partition.

Moreover, adjunct partitions 614, 614a may still utilize a programming model similar to that described above in connection with FIG. 5, which allows adjunct partition code developers to write code in a manner that allows typical operating system-kernel-code locking and synchronization primitives to be simplified or avoided. Adjunct partitions 614, 614a may therefore be efficiently written as single-threaded polling state machines, and by controlling the degree of concurrency visible to a particular adjunct partition instance, it is possible to ensure that adjunct partition code may assume a runtime environment that is non-preemptive and single-threaded. Similarly, it will be appreciated that an adjunct partition consistent with the invention may alternatively be utilized in connection with a self-virtualizing input/output device that utilizes a basic function and a queue structure virtualizable into multiple queue pairs.

Moreover, adjunct partitions may be developed in a manner that maintains the generic VNIC partition interface and thus in most cases requires no modification to any client VNIC device driver in a partition to support new or revised self-virtualizing IO resources. In particular, the server VNIC device driver 618, 618a, and in many cases, the VF driver API 622, 622a, require no modification in order to support a new or revised self-virtualizing IO resource. A developer can rewrite or otherwise adapt vendor-specific virtual function device driver 620, 620a based upon the vendor-specific requirements of a particular self-virtualizing IO resource, then package the device driver with the server VNIC device driver 618, 618a and VF driver API 622, 622a components into an adjunction partition, so that the adjunction partition can be debugged, tested and deployed as a tightly coupled component, typically with deployment occurring via a system firmware update.

Thus, for example, in order to develop an adjunct partition that supports a new or revised a self-virtualizing 10, a developer may develop a resource-specific device driver configured to interface with the self-virtualizing IO resource, and then package the resource-specific device driver in an adjunct partition firmware component along with a vendor-independent server virtual network partition interface device driver, where the vendor-independent server virtual network partition interface device driver is configured to communicate with a vender-independent client virtual network partition interface device driver resident in a logical partition over a vendor-independent virtual network partition interface. Thereafter, the adjunct partition firmware component may be tested and/or debugged with the resource-specific device driver and vendor-independent server virtual network partition interface device driver packaged therein. Once tested and/or debugged, the adjunct partition firmware component may be deployed, e.g., in a system firmware update to the logically partitioned data processing system.

In the illustrated embodiment, the VNIC protocol desirably provides a mechanism that minimizes the number of times data is copied within the memory of the physical system. The virtual I/O model described herein allows for either zero copy using the redirected DMA or single copy when the data is first moved to the memory space of firmware before being DMAed to the client partition.

With the VNIC protocol, command/response queue (CRQ) and Subordinate-CRQ (Sub-CRQ) facilities are used to send and receive VNIC commands to an adjunct partition in system firmware. These facilities, accessible using the hypervisor H-Call interface, provide such features as the ability to register a sub-CRQ under a CRQ, the hypervisor then assigning a queue number and virtual interrupt source for that sub-CRQ; the ability to enable/disable the virtual interrupt source associated with a sub-CRQ; the ability to send to a partner sub-CRQ via the partner sub-CRQ queue number, which is communicated through a higher level protocol, such as a VNIC login command; and the ability to de-register the sub-CRQ associated with a CRQ, effectively severing the communications path.

A VNIC command may include, for example, a sixteen byte packet, with the first byte assigned a value of 0x80, the second byte being a Command Type field, the next ten bytes being command dependent data, and the final four bytes being either command dependent data or a return code. VNIC commands have VNIC command values from 0x0 to 0x7F, and each response to a VNIC command has a VNIC command value that is equal to the command with the 0x80 bit in the command turned on. In the event firmware receives a command it doesn't understand, a response will be returned with an UnknownCommand return code set at offset 12, and the VNIC command type set to the passed in command type with the 0x80 bit Table I below illustrates Command Types supported by the VNIC protocol. For the purposes of this discussion, the VNIC client corresponds to the client device driver in a logical partition, while the firmware corresponds to the server device driver in the associated adjunct partition:

TABLE I

| VNIC Command Types | | | |
|---|---|---|---|
| Command Type | Command value | Sent by | Description |
| VERSION_EXCHANGE | 0x01 | VNIC Client | Used to inform firmware of level of protocol VNIC supports |
| VERSION_EXCHANGE_RSP | 0x81 | Firmware | Used to inform VNIC of level of protocol firmware supports |
| QUERY_CAPABILITY | 0x02 | VNIC Client | Query firmware for a specific VNIC capability |
| QUERY_CAPABILITY_RSP | 0x82 | Firmware | Response for a QUERY_CAPABILITY |
| REQUEST_CAPABILITY | 0x03 | VNIC Client | Request firmware to start using a specific capability value |
| REQUEST_CAPABILITY_RSP | 0x83 | Firmware | Response from firmware to a REQUEST_CAPABILITY command |
| LOGIN | 0x04 | VNIC Client | Used to exchange Sub-CRQ information with system firmware in preparation for functional use of the virtualized adapter |
| LOGIN_RSP | 0x84 | Firmware | Response from firmware with firmware's Sub-CRQ information in preparation for functional use. |
| QUERY_PHYS_PARMS | 0x05 | VNIC Client | Used by VNIC client to enquire about physical port parameters such as line speed, duplex setting, etc. |
| QUERY_PHYS_PARMS_RSP | 0x85 | Firmware | A response to the QUERY_PHYS_PARMS request containing the requested information |
| QUERY_PHYS_CAPABILITIES | 0x06 | VNIC Client | Used by VNIC client to enquire about physical port capabilities such as line speed. |
| QUERY_PHYS_CAPABILITIES_RSP | 0x86 | Firmware | A response to the QUERY_PHYS_CAPABILITIES request containing the requested information. |
| SET_PHYS_PARMS | 0x07 | VNIC Client | Used by the VNIC to set physical port parameters such as line speed if allowed. |
| SET_PHYS_PARMS_RSP | 0x87 | Firmware | Response indicating status of SET_PHYS_PARMS request |
| ERROR_INDICATION | 0x08 | Firmware | Used to indicate to either side of an error condition. |
| REQUEST_ERROR_INFO | 0x09 | VNIC Client | Used to request detailed error data about a previous asynchronous error condition |
| REQUEST_ERROR_RSP | 0x89 | Firmware | Used to return detailed error data in response to a request |

TABLE I-continued

VNIC Command Types

| Command Type | Command value | Sent by | Description |
| --- | --- | --- | --- |
| REQUEST_DUMP_SIZE | 0x0A | VNIC Client | Used to request an estimate of how much size a VNIC collected debug dump will require. |
| REQUEST_DUMP_SIZE_RSP | 0x8A | Firmware | Used to inform VNIC of the dump size estimate. |
| REQUEST_DUMP | 0x0B | VNIC Client | Used to request firmware to perform an adapter & firmware dump to assist in problem determination |
| REQUEST_DUMP_RSP | 0x8B | Firmware | Used to inform VNIC Client when the requested dump has been completed |
| LOGICAL_LINK_STATE | 0x0C | VNIC Client | Used by VNIC Client to tell firmware to start and stop packet reception |
| LOGICAL_LINK_STATE_RSP | 0x8C | Firmware | Used to inform VNIC Client of the status of the LINK_STATE request |
| REQUEST_STATISTICS | 0x0D | VNIC Client | Used to retrieve standard network adapter statistics (bytes/packet sent/rcvd, etc.) |
| REQUEST_STATISTICS_RSP | 0x8D | Firmware | Used to inform VNIC Client when statistics were successfully collected |
| REQUEST_RAS_COMP_NUM | 0x0E | VNIC Client | Used by VNIC Client to retrieve the number of independent firmware components that can have their RAS capabilities controlled in firmware associated with the VNIC |
| REQUEST_RAS_COMP_NUM_RSP | 0x8E | Firmware | Response to the REQUEST_RAS_COMP_NUM command. |
| REQUEST_RAS_COMPS | 0x0F | VNIC Client | Used by VNIC Client to retrieve the list of component ids that can have their RAS capabilities controlled in firmware for this VNIC. |
| REQUEST_RAS_COMPS_RSP | 0x8F | Firmware | Response to the REQUEST_RAS_COMPS_RSP. |
| CONTROL_RAS | 0x10 | VNIC Client | Request firmware to modify RAS characteristics to allow for easier problem determination. |
| CONTROL_RAS_RSP | 0x90 | Firmware | Response to the CONTROL_RAS command. |
| COLLECT_FW_TRACE | 0x11 | VNIC Client | This allows the VNIC Client to collect a trace for a firmware component. |
| COLLECT_FW_TRACE_RSP | 0x91 | Firmware | Inform VNIC Client the trace collection is complete |
| LINK_STATE_INDICATION | 0x12 | Firmware | Inform VNIC Client of link state changes. |
| CHANGE_MAC_ADDR | 0x13 | VNIC Client | Request system firmware to change the current VNIC MAC address |
| CHANGE_MAC_ADDR_RSP | 0x93 | Firmware | Inform VNIC Client of MAC address change request status |
| MULTICAST_CTRL | 0x14 | VNIC Client | Request system firmware to change current multicast MAC address settings |
| MULTICAST_CTRL_RSP | 0x94 | Firmware | Inform VNIC Client of multicast response |
| GET_VPD_SIZE | 0x15 | VNIC Client | Query firmware for the size of VPD |
| GET_VPD_SIZE_RSP | 0x95 | Firmware | Return the size of VPD to VNIC client |
| GET_VPD | 0x16 | VNIC Client | Request system firmware to return VPD associated with adapter. |
| GET_VPD_RSP | 0x96 | Firmware | Response to GET_VPD. |
| TUNE | 0x17 | VNIC Client | Pass debugging information to system firmware |
| TUNE_RSP | 0x97 | Firmware | Response to TUNE command. |
| QUERY_IP_OFFLOAD | 0x18 | VNIC Client | Request details about TCP, UDP, and IP offload capabilities |
| QUERY_IP_OFFLOAD_RSP | 0x98 | Firmware | Response to QUERY_IP_OFFLOAD command. |

TABLE I-continued

VNIC Command Types

| Command Type | Command value | Sent by | Description |
|---|---|---|---|
| CONTROL_IP_OFFLOAD | 0x19 | VNIC Client | Enable and disable TCP, UDP, and IP offload capabilities |
| CONTROL_IP_OFFLOAD_RSP | 0x99 | Firmware | Response to CONTROL_IP_OFFLOAD command. |
| ACL_CHANGE_INDICATION | 0x1A | Firmware | Inform VNIC client of dynamic changes to access controls |
| ACL_QUERY | 0x1B | VNIC Client | Request information about access control limitations in place for this VNIC. |
| ACL_QUERY_RSP | 0x9B | Firmware | Response to ACL_QUERY command. |
| REQUEST_DEBUG_STATS | 0x1C | VNIC Client | Request unarchitected statistics block used for debugging firmware problems. |
| REQUEST_DEBUG_STATS_RSP | 0x9C | Firmware | Response to REQUEST_DEBUG_STATS command. |

Table II below illustrates return values supported by the VNIC protocol:

TABLE II

VNIC Return Values

| Return Code | Value | Definition |
|---|---|---|
| Success | 0 | The requested operation completed successfully. |
| PartialSuccess | 1 | The requested operation completed partially successful. The parameters were valid, but not all resources could be obtained to completely satisfy the command. Check the specific function definition for details. |
| Permission | 2 | The request called for permissions not available. |
| NoMemory | 3 | The request failed due to insufficient memory. |
| Parameter | 4 | One or more parameters were in error in the request. |
| UnknownCommand | 5 | The specific VNIC command is unknown. |
| Aborted | 6 | The command was aborted by some other action. |
| InvalidState | 7 | The requested command is invalid at this time. |
| InvalidIOBA | 8 | An I/O bus address passed as a parameter was invalid. |
| InvalidLength | 9 | A length passed as a parameter was invalid. |
| UnsupportedOption | 10 | A reserved value or option was used on an existing command that system firmware does not support. |
| Reserved | 11-255 | These return codes are reserved. |

Figure 7:
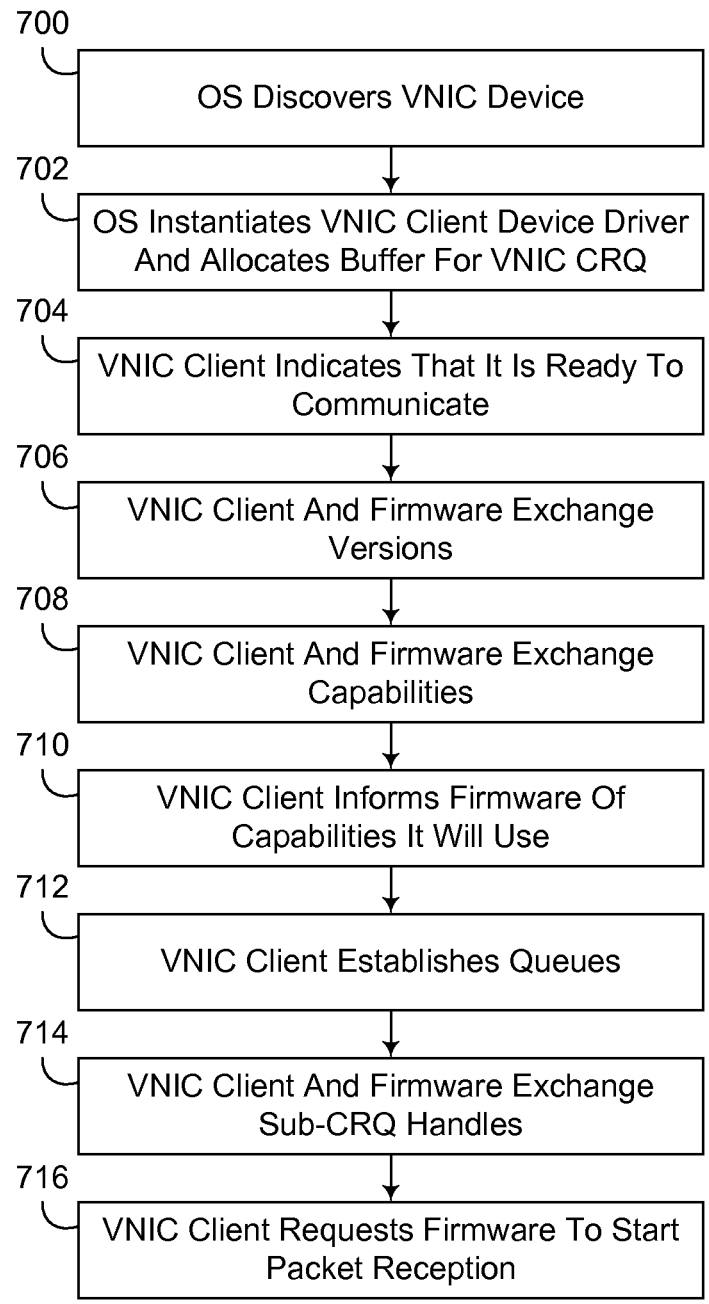
FIG. 7 illustrates an exemplary sequence of operations for initializing a logical partition to communicate with a self-virtualizing IO resource in the data processing system of FIG. 6.

FIG. 7 illustrates an exemplary boot flow, or startup sequence, for the VNIC protocol. First, the partition operating system discovers a VNIC device in the device tree (block 700). Next, the partition operating system instantiates the VNIC client device driver and allocates a buffer for the VNIC CRQ (block 702), which is then TCE-mapped using the VNIC's translation control entry (TCE) table. The VNIC protocol is a command/response protocol, so the VNIC client desirably should allocate a CRQ buffer big enough to handle a response for every command it wishes to have outstanding concurrently with firmware with an allowance for unsolicited asynchronous error and link state change CRQ events.

Next, the VNIC client performs a low level initialization algorithm to indicate that it is ready to communicate (block 704), by making an H_REG_CRQ call specifying the unit address and input/output bus address (IOBA) of the CRQ page(s), and waiting for either an H_Success or INITIALIZATION message. Then, the VNIC client sends either an INITIALIZATION_COMPLETE or an INITIALIZATION message to firmware by calling H_SEND_CRQ.

Once the INITIALIZATION and INITIALIZATION_COMPLETE messages have been exchanged, the VNIC client and system firmware exchange version information (block 706). In particular, the VNIC client sends a VERSION_EXCHANGE using H_SEND_CRQ, specifying the latest version of the VNIC protocol supported by the VNIC client. Next, firmware responds with a VERSION_EXCHANGE_RSP specifying the version it supports. Both the VNIC client and firmware are required to support the lower of the two versions. Until and unless the VNIC client receives a VERSION_EXCHANGE_RSP, no further VNIC commands may be sent.

Next, the VNIC client uses QUERY_CAPABILITY commands to interrogate what the firmware supports currently, and the firmware responds with QUERY_CAPABILITY_RSP messages for each query sent (block 708). Multiple QUERY_CAPABILITY commands may be sent in parallel, up to one for each capability being interrogated. Capabilities may include attributes such as requested, minimum and maximum numbers of firmware-supported transmit completion/submission queues, receive completion queues, receive buffer add queues per receive completion queue, transmit entries per Sub-CRQ, receive buffer add entries per Sub-CRQ, MTU size; support for TCP/IP offload, promiscuous mode, VLAN header insertion, receive scatter/gather mode; maximum number of unique multicast MAC address filters; maximum transit scatter gather entries, etc.

Once the queries are returned, the VNIC client uses REQUEST_CAPABILITY commands to inform the firmware of the capabilities it plans on using (block 710). Until the capability has been requested and a successful response has been received, it will not function, and commands which use the capabilities will fail.

The VNIC client then establishes queues (block 712). In particular, the VNIC client determines how many Sub-CRQs to set up based on the capabilities negotiated with the server and partition configuration, and attempts to set those up by allocating memory, mapping them with TCEs, and calling H_REG_SUB_CRQ iteratively for each Sub-CRQ. Once the VNIC client has successfully gotten each Sub-CRQ it needs registered (with some possibly failing due to unavailable resources), it parcels them out to specific queues (Transmit Completion and Receive Completion), and does a REQUEST_CAPABILITY for the appropriate number of each from the firmware.

Once the VNIC client has all Sub-CRQs registered, it exchanges Sub-CRQ handles with the firmware by sending a LOGIN CRQ to the server, specifying each Sub-CRQ handle and purpose, and waiting for a LOGIN_RSP which includes the server's Sub-CRQ handles and purposes (block 714). Once the LOGIN_RSP has been returned successfully, the VNIC client is free to utilize the Transmit Submission Sub-CRQs and Receive Buffer Add Sub-CRQs, as well as any other VNIC command.

Once the VNIC client is ready to receive frames (for the Logical Link State to transition to Link Up), it requests the firmware to start packet reception (block 716) by sending a LOGICAL_LINK_STATE command to the firmware. If the VNIC client is also in control of the physical port, sending the LOGICAL_LINK_STATE command has the side effect of initiating physical port link negotiation, as appropriate. The firmware then sends a LOGICAL_LINK_STATE_RSP once the link state is up, and startup of the VNIC client is complete.

Figure 8:
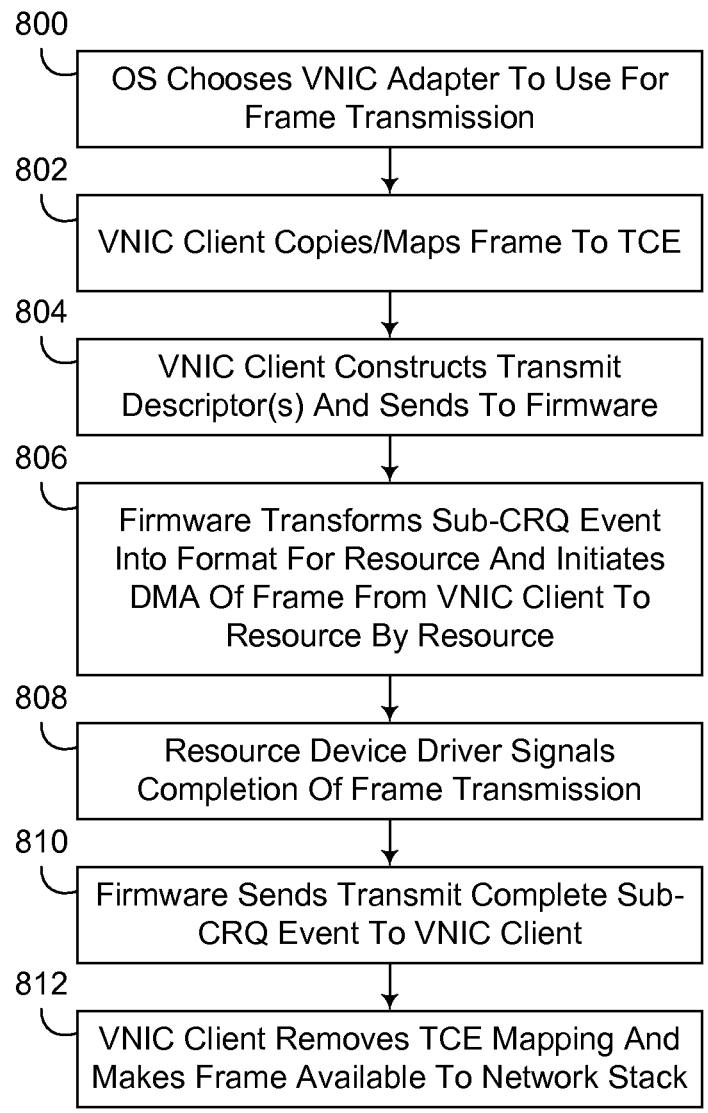
FIG. 8 illustrates an exemplary sequence of operations for transmitting a network frame in the data processing system of FIG. 6.

FIG. 8 illustrates an exemplary frame transmission sequence for the VNIC protocol. Transmission of Ethernet frames using the VNIC protocol is accomplished using two or more Sub-CRQs. The VNIC client allocates one or more Transmit Completion Sub-CRQs and system firmware allocates one or more Transmit Submission CRQs. The handles for each are exchanged during the LOGIN processing. The following sequence details the simplified transmission of an Ethernet frame. As with any CRQ or Sub-CRQ based protocol, the listed virtual interrupts may not occur for every CRQ or Sub-CRQ that is sent using H_SEND_CRQ, H_SEND_SUB_CRQ, or H_SEND_SUB_CRQ_INDIRECT. It is desirable with the VNIC protocol to allow the VNIC client and system firmware to batch frame transmission submission and transmit complete indications to minimize the number of virtual interrupts and to make the transmission of Ethernet frames as efficient as possible. In addition, multiple Sub-CRQs may be presented to either the VNIC or system firmware with a single virtual interrupt.

First, the partition operating system chooses a VNIC adapter to use for frame transmission (block 800). The VNIC client device driver either copies the frame into a private buffer that's already been mapped via a TCE or maps the frame with a TCE (block 802).

Next, the VNIC client device driver constructs a Transmit Descriptor (or multiples) describing the TCE mapped buffer, and uses H_SEND_SUB_CRQ to pass the Transmit Descriptor to system firmware's Transmit Submission Sub-CRQ (block 804). System firmware receives the Sub-CRQ event, and transforms it into the appropriate format for the specific self-virtualizing IO resource adapter being virtualized, and uses its embedded device driver to send the frame out the wire (block 806). The system firmware uses redirected DMA to enable the adapter to DMA the frame directly from the VNIC client by setting up the adapter's associated TCE table. In addition, as discussed above, the transformation of the event into the appropriate format for the self-virtualizing IO resource is performed by the adjunct partition, with the VNIC server device driver transforming the event and calling the VF driver API with the correct information for the transmit.

Next, the vender-specific virtual function resource interrupts system firmware (or system firmware polls for completion at appropriate times) indicating the frame has been successfully transmitted (block 808), by notifying the VNIC server device driver via the VF driver API that the transfer is complete. The redirected mapping is removed after the transmit completion occurs. The VNIC server device driver then constructs a Transmit Completion Sub-CRQ event, and places that Sub-CRQ onto the Transmit Completion Sub-CRQ (block 810) to send a transmit complete sub-CRQ to the VNIC client on the correct sub-CRQ. The VNIC client removes the TCE mapping for the frame, and makes it available to its network stack (block 812), whereby transmission of the frame is complete.

Figure 9:
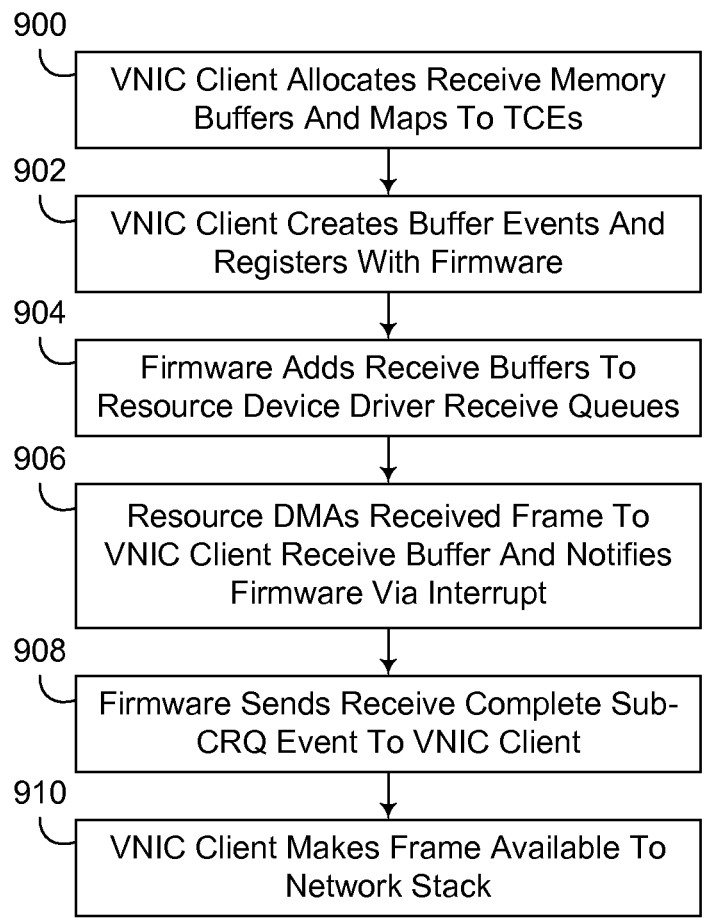
FIG. 9 illustrates an exemplary sequence of operations for receiving a network frame in the data processing system of FIG. 6.

FIG. 9 illustrates an exemplary frame reception sequence for the VNIC protocol. Reception of Ethernet frames is accomplished using two or more Sub-CRQs, similar to frame transmission. System firmware creates one or more Receive Buffer Add Sub-CRQs and the VNIC client creates one or more Receive Completion Sub-CRQs. The sequence details the simplified reception of an Ethernet frame. As with any CRQ or Sub-CRQ based protocol, the listed virtual interrupts may not occur for every CRQ or Sub-CRQ that is sent using H_SEND_CRQ, H_SEND_SUB_CRQ, or H_SEND_SUB_CRQ_INDIRECT, and the VNIC protocol allows the VNIC client and system firmware to batch frame reception and buffer adding to minimize the number of virtual interrupts and to make the reception of Ethernet frames as efficient as possible. Multiple Sub-CRQs may be presented to either the VNIC or system firmware with a single virtual interrupt.

When the VNIC client is started, the VNIC client allocates several memory buffers to be used to the reception of Ethernet frames, and the VNIC client maps those buffers with TCEs using its TCE mapping services (block 900). Then, for each receive buffer, the VNIC client creates Add Receive Buffer Descriptor events, and gives them to system firmware via the Receive Buffer Add Sub-CRQ using H_SEND_SUB_CRQ or H_SEND_SUB_CRQ_INDIRECT (block 902). Once this is done, the VNIC client should not use or otherwise modify the receive buffer until it's been given back to the VNIC client using the Receive Sub-CRQ or the Sub-CRQs and CRQ have been freed using H_FREE_SUB_CRQ and H_FREE_CRQ.

Next, as system firmware receives the Receive Buffer Add Sub-CRQ events, it uses its physical adapter (resource) device driver (i.e., the vendor-specific virtual function device driver in the adjunct partition) to add the receive buffer to the physical adapter's receive queues (block 904).

Then, when a frame arrives for the physical adapter off of the physical wire, the adapter DMAs the frame directly to the VNIC client's memory for one of the receive buffers and notifies system firmware of the received frame using an interrupt (block 906). Firmware uses the information it saves to generate a Receive Completion event Sub-CRQ, and places it on the appropriate Receive Completion Sub-CRQ (block 908). The VNIC client then receives a virtual interrupt for its Receive Completion Sub-CRQ, and passes the frame up its network stack (block 910), whereby the frame reception is complete.

Frame transmission and reception in the VNIC protocol is desirably handled through the Sub-CRQ infrastructure, using the H_SEND_SUB_CRQ and H_SEND_SUB_CRQ_INDIRECT hypervisor calls. Since each Transmit Completion Sub-CRQ is tied to a specific Transmit Submission Sub-CRQ, the Transmit Descriptor correlator desirably must only be unique for a given Transmit Completion Sub-CRQ. Several versions of Transmit Descriptors may exist. Each version has a Descriptor Version byte at byte offset one in the descriptor, which specifies the layout of the later bytes. A sorted array is returned in the LOGIN response specifying all versions of transmit descriptor supported by the VNIC, with the versions of the transmit descriptor offering the best performance appear in the array first.

In addition, multiple Receive Buffer Add Sub-CRQs can be configured to allow the VNIC client to efficiently allocate receive buffers of different sizes. In the event multiple Sub-CRQs are allocated for this purpose, it is the VNIC client's responsibility to always allocate the receive buffer size for the Receive Buffer Add Sub-CRQs that are returned by system firmware. System firmware configures the correct buffer sizes based on the current VNIC maximum transmission unit, current number of Receive Buffer Add Sub-CRQs, and physical adapter capabilities. In all cases, all receive buffers given to an individual Receive Buffer Add Sub-CRQ must be of the same size. A Receive Buffer Correlator may appear on only a single Receive Completion Sub-CRQ, so the Receive Buffer Correlators typically must be unique for a given Receive Completion Sub-CRQ. In addition, every buffer added to all Receive Buffer Add Sub-CRQs associated with a given Receive Completion Sub-CRQ may be received simultaneously, so each Receive Completion Sub-CRQ should be sized to handle every possible buffer given to system firmware on its associated Receive Buffer Add Sub-CRQs.

Additional operations that may be performed via the VNIC protocol include operations such as adapter reboot operations, partition mobility operations and dump operations, among others. In the event that system firmware encounters an error, needs to update the firmware on the adapter, or needs to remove the virtualized adapter from the partition, the following operations may be performed to reboot the adapter. First, the firmware closes its CRQ and Sub-CRQs, and the VNIC client receives a TRANSPORT_EVENT specifying Partner Partition Closed or receives an H_Closed return code on a H_SEND_CRQ or H_SEND_SUB_CRQ hypervisor call. The VNIC client closes all Sub-CRQs and CRQ using H_FREE_SUB_CRQ and H_FREE_CRQ, and the VNIC client cleans up all outstanding unacknowledged transmit frames and receive buffers that had been given to the firmware. The VNIC client then opens the CRQ, and attempts the aforementioned boot sequence.

In the event that a logical partition is migrated to a new platform, the following sequence of operations takes place. First, the VNIC client receives a TRANSPORT_EVENT event specifying the Partner Partition Suspended. The VNIC client pauses submission of new transmit frames and receive add buffers, and closes all Sub-CRQs. The VNIC client completes all outstanding unacknowledged transmit frames, which may include queuing them for retransmission once the VNIC is recovered, or completing them as dropped, letting higher layers of the TCP/IP stack perform retransmission. The VNIC client calls H_ENABLE_CRQ until H_Success is returned, and then the VNIC client attempts the boot sequence.

To perform a dump collection, the following sequence of operations may be performed. First, upon the VNIC client deciding on the need for a VNIC dump, the VNIC client sends a REQUEST_DUMP_SIZE command to system firmware. The firmware responds with a REQUEST_DUMP_SIZE_RSP with an estimate on the amount of storage required to store the dump into VNIC client memory. The VNIC client allocates a buffer big enough to hold the dump, and maps it with TCEs. The VNIC client then sends a REQUEST_DUMP command to system firmware containing the IOBAs referring to the dump buffer. System firmware uses the supplied dump buffer to collect the memory that's previously been registered by firmware as important for dumps, and optionally collects physical adapter debug data into the dump buffer as well. System firmware sends a REQUEST_DUMP_RSP response to the VNIC client, indicating the dump is complete.

With respect to the other commands identified in Table I above, a VNIC client may use the QUERY_PHYS_PARM command to retrieve information about the current physical port state such as current link speed and state. A VNIC client may use the QUERY_PHYS_CAPABILITIES command to retrieve information about the current capabilities of the physical adapter associated with the VNIC, including allowed speed, duplex, and ability to modify those values. If the system administrator has configured the VNIC to have physical port configuration authority, the VNIC client may also use the SET_PHYS_PARMS command to change those values.

When the VNIC does not have authority to change the physical port parameters, the LOGICAL_LINK_STATE command and response provide a method for the VNIC to inform system firmware when it's ready to receive packets.

The QUERY_IP_OFFLOAD command allows the VNIC client to determine what facilities exist in the VNIC system firmware, and its limitations, if any. Based on the capabilities and limitations, the CONTROL_IP_OFFLOAD command allows the VNIC client to enable appropriate offload capabilities.

The VNIC protocol includes RAS support that allows the tracing of information within system firmware, and control of consistency checking done by firmware. Individual components of firmware are exposed to the VNIC Client, and each component can independently have their tracing and error checking levels increased and decreased. Each individual component's trace information can be collected independently from others, and trace entries are returned to the VNIC client in timebase order. The upper 16 bits of the trace ID for the Firmware Trace Data Format is an AIX RAS tracehook ids, and the lower 16 bits are an AIX RAS subhookid. Prior to a successful LOGIN request, all components related to the VNIC may not be available in the list of components. To get a complete list of all possible components, the RAS commands should be delayed until after a successful LOGIN unless a pre-LOGIN problem is being diagnosed. The CONTROL_RAS command can be used to resize the individual components' trace buffers, but due to the limited memory available in the system firmware, increasing the sizes of one trace buffer may require decreasing the size of a different component's trace buffer.

The REQUEST_STATISTICS command may be used by the VNIC client to obtain statistic counters kept by system firmware and the physical adapter supporting the VNIC. In the event a given VNIC does not support the retrieval of certain of the statistics, the statistic may have a −1 value returned in it. The REQUEST_DEBUG_STATS command may be used by the VNIC client to retrieve an unarchitected block of statistics that is implementation dependent which may be used to debug firmware problems.

If system firmware encounters an error processing requests related to the physical adapter being virtualized by the VNIC interface, it may generate ERROR_INDICATION commands to the VNIC client. The VNIC client may then, at its discretion, obtain detailed error information using the REQUEST_ERROR_INFO command. The REQUEST_ERROR_INFO_RSP command may be used by firmware to indicate the successful retrieval of error information. The retrieval of detailed error information allows firmware to reuse the resources for tracking that error. If system firmware encounters an error while the VNIC client is not connected, firmware will log the detailed error information using firmware error logging methods. Firmware will have a finite amount of space reserved for storing detailed error information. In some situations, some detailed error information may be unavailable in response to a REQUEST_ERROR_INFO command if too many errors are being logged in firmware. If the detailed error information is overwritten prior to the VNIC client performing the relative REQUEST_ERROR_INFO command, an error return code will be returned.

The MULTICAST CTRL command allows the VNIC client to manage the reception of Multicast Ethernet traffic. Individual multicast MAC addresses may be enabled and disabled, as well as all multicast traffic. The VNIC client can choose to enable more than the maximum unique multicast Ethernet addresses as returned in the Capabilities exchange. In the event the VNIC client does so, system firmware may either enable the MAC address via a non-exact hashing multicast reception mechanism if the hardware supports it, or may enable all multicast addresses. When this is done, system firmware reports exact matches through the unique multicast Ethernet filter via an Exact Match bit defined in a Receive Completion Descriptor. If the Exact Match bit is off, and a multicast packet was returned in the Receive Completion Descriptor, the multicast packet either matches a non-exact hashing mechanism if one exists or system firmware has enabled all multicast MAC address reception.

The LINK_STATE_INDICATION command is an unacknowledged command sent by system firmware to inform the VNIC client when the state of the link changes. The VNIC client can also use QUERY_PHYS_PARMS at any time to poll for link state changes. VPD commands may be used by the VNIC client to collect, store, and display VPD related to the physical adapter backing the VNIC. The CHANGE_MAC_ADDR command allows the VNIC client to change the current MAC address. The request to change may fail due to Access Control List entries set up by the administrator. The TUNE command may be used by the VNIC client to opaquely pass tuning data from the VNIC client to system firmware.

The VNIC may have certain Access Control Lists (ACLs) in effect, and some of these may change dynamically. The ACL_CHANGE_INDICATION command may be sent by system firmware to the VNIC client in the event any of the ACLs have changed dynamically. The ACL_QUERY command may be used by the VNIC client to obtain information about the ACLs in effect to enable earlier error checking or ease of use functions.

It will be appreciated that the specific commands utilized in the VNIC protocol, as well as the assignment of fields to such commands or to buffers utilized to transmit data between a VNIC client and VNIC server, may vary in different embodiments. Moreover, implementation of such a protocol in a logically partitioned data processing system, as well as interfacing a VNIC server and a device-specific virtual function device driver, e.g., through a VF driver API, would be within the abilities of one of ordinary skill in the art having the benefit of the instant disclosure.

Additional details regarding the vendor-independent virtual network partition interface may be found, for example, in U.S. patent application Ser. No. 12/946,316, filed on Nov. 15, 2010 by Cunningham et al., and entitled "VIRTUALIZATION OF VENDOR SPECIFIC NETWORK INTERFACES OF SELF-VIRTUALIZING INPUT/OUTPUT DEVICE VIRTUAL FUNCTIONS," which is incorporated by reference herein.

Simplified DMA Mappings for Self-Virtualizing IO Resource

When using firmware to virtualize an SRIOV Ethernet virtual function, one of the benefits of virtualization is using the firmware to enable advanced functions like partition mobility (migration of a logical partition between physical systems) and active memory sharing. These advanced functions typically require the use of virtual translation control entries (TCE) to enable DMA operations. A TCE is a handle used for IO devices to a real memory address that includes read and write permission bits for that memory space. These TCEs are typically grouped in a table that is managed by a device driver through firmware interfaces. Since during partition mobility the virtualized SRIOV Ethernet virtual function will transition to a new physical system with a new SRIOV Ethernet virtual function, two separate TCE tables typically must be used, one for the hardware SRIOV Ethernet virtual function and one for the virtualized partition interface with the logical partition. The device driver manages which TCE entry in the virtualized table to use, typically managed as a pseudo-heap data structure. In order for the hardware to DMA to and from the device driver's memory, the addresses must be placed in the hardware's TCE table. The hardware's TCE table could potentially be managed in the same manner as the virtualized partition interface, but would have extra overhead of memory and code path. Embodiments consistent with the invention, on the other hand, eliminate the additional code that would otherwise be required to perform such management by using only a portion of the hardware's TCE table and making the two TCE tables the same size. This allows a one-to-one mapping of virtualized TCE to hardware TCE, and enabling firmware to use the same index in the virtualized TCE table for the hardware's TCE table that the device driver already chose.

Figure 10:
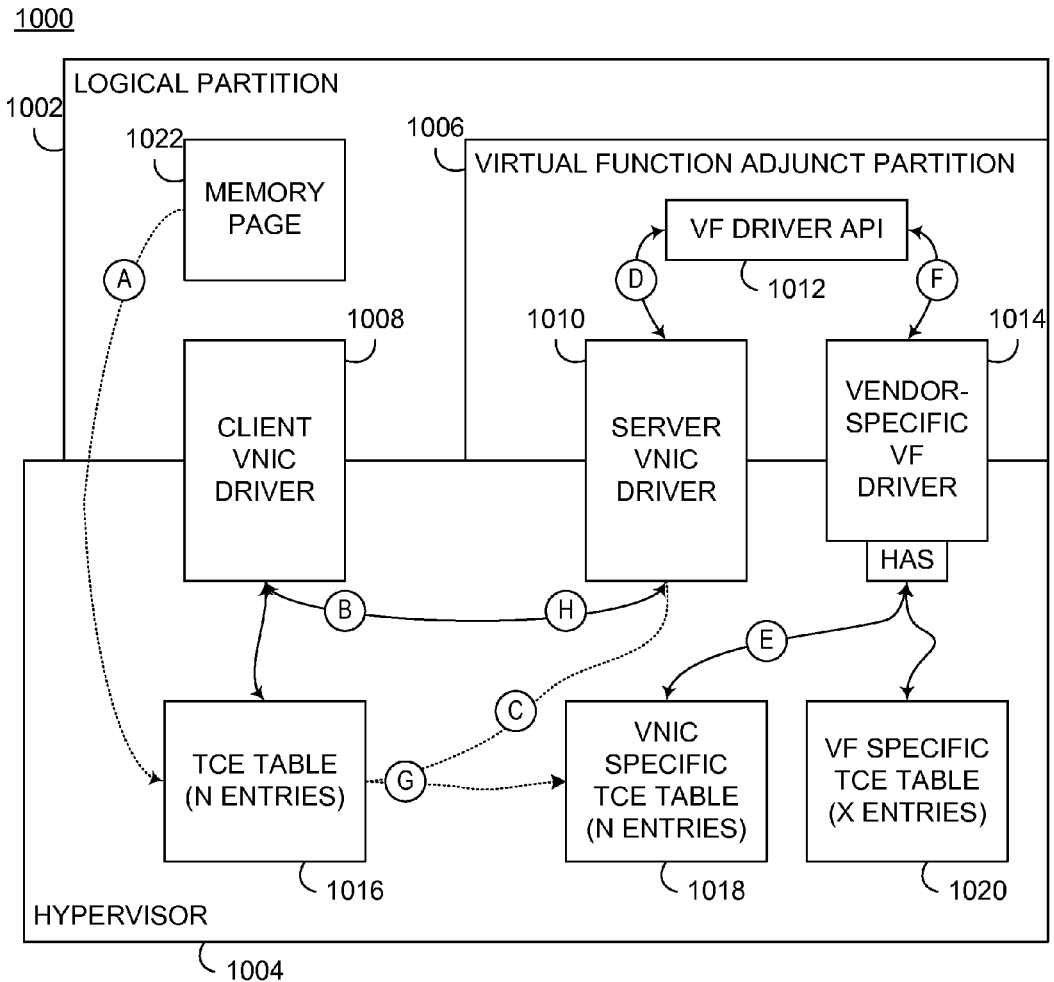
FIG. 10 illustrates one embodiment of a data processing system suitable for implementing a simplified DMA mapping to for a self-virtualizing IO resource virtual function consistent with the invention.

To further illustrate the concept of simplified DMA mapping, FIG. 10 illustrates at 1000 a logical partition 1002, hypervisor 1004 and virtual function adjunct partition 1006 similar to those illustrated for data processing system 600 of FIG. 6. Also similar to data processing system 600 of FIG. 6, client and server VNIC device drivers 1008, 1010 provide a virtualized partition interface between logical partition 1002 and virtual function adjunct partition 1006, while a virtual function device driver API 1012 and vendor-specific virtual function device driver 1014 (which functions as a resource device driver) interface server VNIC device driver 1010 with the virtual function of a self-virtualizing IO resource (not shown in FIG. 10).

Multiple TCE tables are resident in hypervisor 1004 to facilitate data transfers between logical partition 1000 and the self-virtualizing IO resource. A first TCE table 1016 is associated with the virtualized interface, and in particular, associated with and accessible to client VNIC driver 1008. A second TCE table 1018 is associated with and accessible to virtual function device driver 1014. Hypervisor calls are supported in hypervisor 1004 to enable device drivers 1008 and 1014 to access and manage TCE tables 1016, 1018.

In embodiments consistent with the invention, TCE table 1018 is created to be the same size, i.e., to have the same number of TCE entries, as TCE table 1016. Doing so enables the same indexed TCE entry to be used in both tables when performing a redirected DMA between the logical partition and the self-virtualizing IO resource, and eliminates the need to implement any mapping algorithm, e.g., a hashing algorithm, to map between the TCE entries in the two TCE tables.

An additional TCE table 1020 may also be supported in hypervisor 1004, and is used by the VF device driver for control mappings, e.g., for DMA to/from the adjunct partition controlling the resource (e.g., statistics, control queues, transmit/receive control blocks, etc.) TCE table 1020 need not be the same size as TCE tables 1016, 1018.

Figure 11:
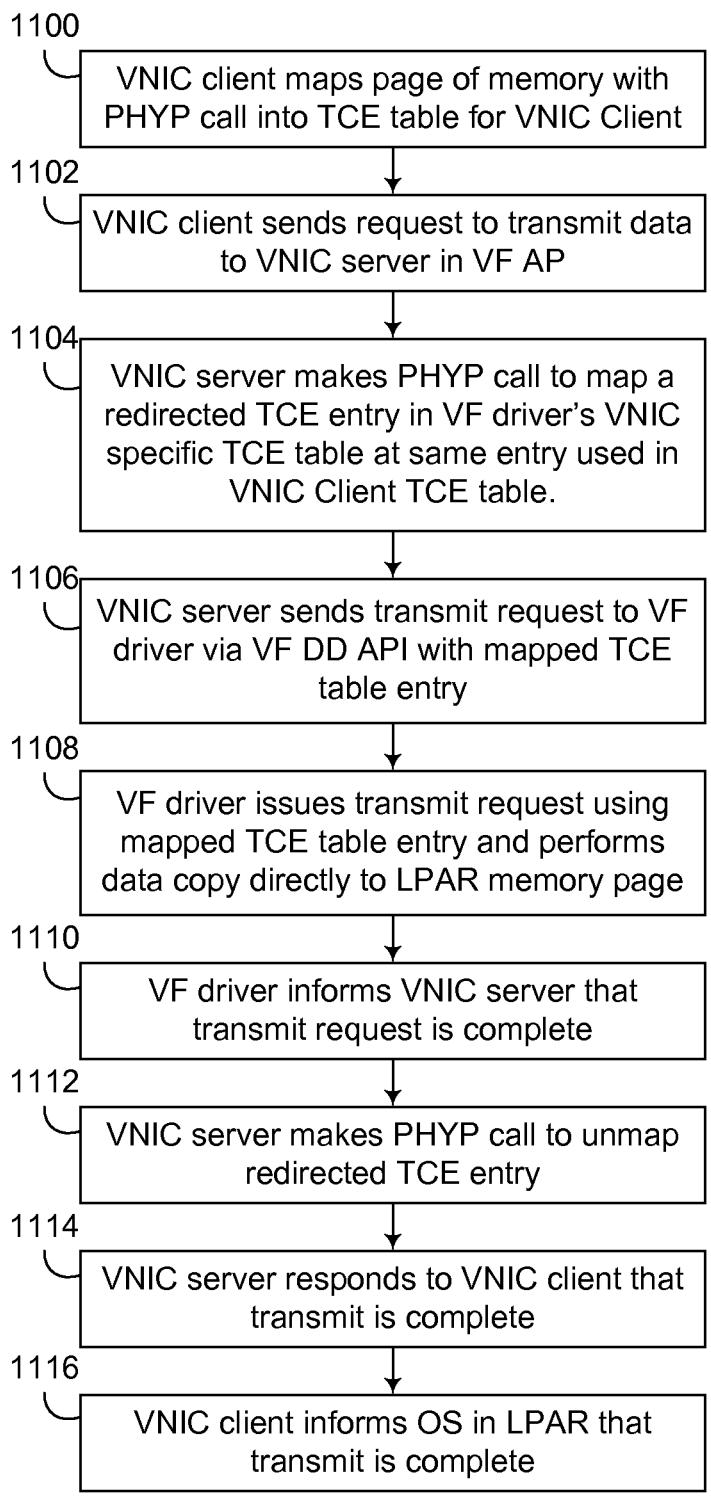
FIG. 11 illustrates an exemplary sequence of operations for transmitting a network frame using simplified DMA mapping in the data processing system of FIG. 10.

Now turning to FIG. 11, and with continuing reference to FIG. 10, an exemplary sequence of operations for transmitting a frame of data from a logical partition to a self-virtualizing IO resource using simplified redirected DMA mappings is further illustrated. First, in block 1100 (step A of FIG. 10), client VNIC device driver 1008 maps a page of memory (memory page 1022 of FIG. 10) with a TCE entry in TCE table 1016 using a hypervisor call.

Next, in block 1102 (step B of FIG. 10), client VNIC device driver 1008 sends a request to transmit data (contained within page of memory 1022) to server VNIC device driver 1010 adapter in adjunct partition 1006.

Next, in block 1104 (step C of FIG. 10), server VNIC device driver 1010 uses a hypervisor call to map a redirected TCE entry for the request in the VF device driver's VNIC specific TCE table 1018 at the same index or entry that was used in the client VNIC device driver TCE table 1016, and including a pointer to the memory page along with any necessary permission bits. The determination of the mapping is simplified by the fact that the client VNIC device driver TCE table 1016 and VF device driver VNIC specific TCE table 1018 are the same size, thus removing the need for additional algorithms or hashing to determine the correct location for the redirected TCE entry in the VF device driver VNIC specific TCE table 1018.

Next, in block 1106 (step D of FIG. 10), server VNIC device driver 1010 sends the transmit request to the VF device driver 1014 via VF device driver API 1012, providing the TCE table entry in VF device driver VNIC specific TCE table 1018 that was mapped in block 1104.

Next, in block 1108 (step E of FIG. 10), VF device driver 1014 performs the transmit request using the TCE table entry mapped in block 1106 and initiates a request to cause the self-virtualizing IO resource to start the DMA operation between the resource and client memory page 1022.

Next, in block 1110 (step F of FIG. 10), VF device driver 1014 informs server VNIC device driver 1010 that the transmit request is complete. Thereafter, in block 1112 (step G of FIG. 10), server VNIC device driver 1010 uses a hypervisor call to unmap the redirected TCE entry in VNIC specific TCE table 1018.

Next, in block 1114 (step H of FIG. 10), server VNIC device driver 1010 responds to client VNIC device driver 1008 that the transmit is complete, and in block 1116 client VNIC device driver 1008 informs the operating system in logical partition 1002 that the transmit is complete.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of accessing a self-virtualizing input/output (IO) resource with multiple logical partitions in a data processing system, the method comprising:
   interfacing a logical partition of the multiple logical partitions to an associated adjunct partition through a virtual partition interface, the adjunct partition including a server virtual partition interface device driver configured to interface with a client virtual partition interface device driver in the logical partition and a resource device driver configured to interface with a virtual function or queue pair of the self-virtualizing IO resource, wherein the virtual partition interface interfaces the client virtual partition interface device driver with the server virtual partition interface device driver; and
   communicating data between the logical partition and the self-virtualizing IO resource by performing a direct memory access (DMA) operation between a buffer in the logical partition and the self-virtualizing IO resource using first and second translation control entry (TCE) tables, the first TCE table associated with the client virtual partition interface device driver and the second TCE table associated with the resource device driver, wherein the first and second TCE tables each include a same number of TCE entries, and wherein a first TCE entry in the first TCE table that is mapped to the buffer in the logical partition is indexed at a same index in the first TCE table as a second TCE entry in the second TCE table that is used by the resource device driver to initiate the DMA operation between the buffer and the self-virtualizing IO resource.

2. The method of claim 1, wherein performing the DMA operation includes:
   with the client virtual partition interface device driver, mapping an address for the buffer into the first TCE entry in the first TCE table and sending a request to the server virtual partition interface driver to transmit data in the buffer;
   with the server virtual partition interface device driver, mapping the second TCE entry in the second TCE table at the same index as the first TCE entry in the first TCE table;
   with the server virtual partition interface device driver, sending a request to the resource device driver identifying the second TCE entry; and
   with the resource device driver, performing the DMA operation using the second TCE entry to copy between the buffer and the self-virtualizing IO resource.

3. The method of claim 2, wherein the second TCE entry is a redirected TCE entry, and wherein the DMA operation is a redirected DMA operation.

4. The method of claim 2, wherein the first and second TCE tables are resident in a hypervisor, and wherein mapping the address with the client virtual partition interface device driver and mapping the second TCE entry with the server virtual partition interface device driver are performed via hypervisor calls.

5. The method of claim 2, further comprising, with the resource device driver, notifying the server virtual partition interface device driver that the DMA operation is complete, and in response thereto, and with the server virtual partition interface device driver, unmapping the second TCE entry from the second TCE table.

6. The method of claim 2, further comprising interfacing the server virtual network partition interface device driver and the resource device driver through a device driver application programming interface (API), wherein sending the request to the resource device driver with the server virtual partition interface device driver is performed by a call to the device driver API.

7. The method of claim 1, wherein the adjunct partition includes a separate dispatchable state and employs a virtual address space donated from the logical partition or a hypervisor of the data processing system.

8. The method of claim 7, wherein interfacing the logical partition to the associated adjunct partition comprises interfacing the adjunct partition to an associated virtual function of the self-virtualizing IO resource.

9. The method of claim 1, wherein the virtual partition interface comprises a vendor-independent virtual network partition interface, the client virtual partition interface device driver comprises a vendor-independent client virtual network partition interface device driver, and the server virtual partition interface device driver comprises a vendor-independent server virtual network partition interface device driver.

10. The method of claim 1, wherein the self-virtualizing IO resource comprises a single root input/output virtualization (SRIOV) Ethernet adapter.

11. An apparatus, comprising:
at least one processor; and
program code configured upon execution by the at least one processor to interface a self-virtualizing input/output (IO) resource with multiple logical partitions in a data processing system, wherein the program code is further configured to:
interface a logical partition of the multiple logical partitions to an associated adjunct partition through a virtual partition interface, the adjunct partition including a server virtual partition interface device driver configured to interface with a client virtual partition interface device driver in the logical partition and a resource device driver configured to interface with a virtual function or queue pair of the self-virtualizing IO resource, wherein the virtual partition interface interfaces the client virtual partition interface device driver with the server virtual partition interface device driver; and
communicate data between the logical partition and the self-virtualizing IO resource by performing a direct memory access (DMA) operation between a buffer in the logical partition and the self-virtualizing IO resource using first and second translation control entry (TCE) tables, the first TCE table associated with the client virtual partition interface device driver and the second TCE table associated with the resource device driver, wherein the first and second TCE tables each include a same number of TCE entries, and wherein a first TCE entry in the first TCE table that is mapped to the buffer in the logical partition is indexed at a same index in the first TCE table as a second TCE entry in the second TCE table that is used by the resource device driver to initiate the DMA operation between the buffer and the self-virtualizing IO resource.

12. The apparatus of claim 11, wherein the program code is configured to perform the DMA operation by:
with the client virtual partition interface device driver, mapping an address for the buffer into the first TCE entry in the first TCE table and sending a request to the server virtual partition interface driver to transmit data in the buffer;
with the server virtual partition interface device driver, mapping the second TCE entry in the second TCE table at the same index as the first TCE entry in the first TCE table;
with the server virtual partition interface device driver, sending a request to the resource device driver identifying the second TCE entry; and
with the resource device driver, performing the DMA operation using the second TCE entry to copy between the buffer and the self-virtualizing IO resource.

13. The apparatus of claim 12, wherein the second TCE entry is a redirected TCE entry, and wherein the DMA operation is a redirected DMA operation.

14. The apparatus of claim 12, wherein the first and second TCE tables are resident in a hypervisor, and wherein the client virtual partition interface device driver is configured to map the address the server virtual partition interface device driver is configured to map the second TCE entry via hypervisor calls.

15. The apparatus of claim 12, wherein the resource device driver is further configured to notify the server virtual partition interface device driver that the DMA operation is complete, and in response thereto, the server virtual partition interface device driver, is configured to unmap the second TCE entry from the second TCE table.

16. The apparatus of claim 12, wherein the program code is further configured to interface the server virtual network partition interface device driver and the resource device driver through a device driver application programming interface (API), and wherein the server virtual partition interface device driver is configured to send the request to the resource device driver by calling the device driver API.

17. The apparatus of claim 11, wherein the adjunct partition includes a separate dispatchable state and employs a virtual address space donated from the logical partition or a hypervisor of the data processing system.

18. The apparatus of claim 17, wherein the program code is configured to interface the logical partition to the associated adjunct partition by interfacing the adjunct partition to an associated virtual function of the self-virtualizing IO resource.

19. The apparatus of claim 11, wherein the virtual partition interface comprises a vendor-independent virtual network partition interface, the client virtual partition interface device driver comprises a vendor-independent client virtual network partition interface device driver, and the server virtual partition interface device driver comprises a vendor-independent server virtual network partition interface device driver.

20. The apparatus of claim 11, wherein the self-virtualizing IO resource comprises a single root input/output virtualization (SRIOV) Ethernet adapter.

21. A program product, comprising:
a non-transitory computer readable medium; and
program code stored on the computer readable medium and configured upon execution to interface a self-virtualizing input/output (IO) resource with multiple logical partitions in a data processing system, wherein the program code is further configured to:
interface a logical partition of the multiple logical partitions to an associated adjunct partition through a virtual partition interface, the adjunct partition including a server virtual partition interface device driver configured to interface with a client virtual partition interface device driver in the logical partition and a resource device driver configured to interface with a virtual function or queue pair of the self-virtualizing IO resource, wherein the virtual partition interface interfaces the client virtual partition interface device driver with the server virtual partition interface device driver; and
communicate data between the logical partition and the self-virtualizing IO resource by performing a direct memory access (DMA) operation between a buffer in the logical partition and the self-virtualizing IO resource using first and second translation control entry (TCE) tables, the first TCE table associated with the client virtual partition interface device driver and the second TCE table associated with the resource device driver, wherein the first and second TCE tables each include a same number of TCE entries, and wherein a first TCE entry in the first TCE table that is mapped to the buffer in the logical partition is indexed at a same index in the first TCE table as a second TCE entry in the second TCE table that is used by the resource device driver to initiate the DMA operation between the buffer and the self-virtualizing IO resource.

* * * * *